US012656556B2

(12) United States Patent
Li et al.

(10) Patent No.: US 12,656,556 B2
(45) Date of Patent: Jun. 16, 2026

(54) REFLOWABLE OPTICAL FIBER CONNECTOR

(71) Applicant: Ayar Labs, Inc., Santa Clara, CA (US)

(72) Inventors: Jianhua Li, Santa Clara, CA (US); Chong Zhang, San Jose, CA (US)

(73) Assignee: Ayar Labs, Inc., San Jose, CA (US)

( * ) Notice: Subject to any disclaimer, the term of this patent is extended or adjusted under 35 U.S.C. 154(b) by 239 days.

(21) Appl. No.: 18/486,059

(22) Filed: Oct. 12, 2023

(65) Prior Publication Data

US 2025/0012980 A1      Jan. 9, 2025

Related U.S. Application Data

(60) Provisional application No. 63/524,739, filed on Jul. 3, 2023.

(51) Int. Cl.
G02B 6/38          (2006.01)

(52) U.S. Cl.
CPC ......... G02B 6/3839 (2013.01); G02B 6/3882 (2013.01)

(58) Field of Classification Search
None
See application file for complete search history.

(56) References Cited

U.S. PATENT DOCUMENTS

| | | | |
|---|---|---|---|
| 4,830,456 A | 5/1989 | Kakii et al. | |
| 6,402,389 B1 * | 6/2002 | Steijer ................. | G02B 6/3829 385/83 |
| 6,447,171 B1 | 9/2002 | Demangone et al. | |
| 2003/0113089 A1 * | 6/2003 | Lee ...................... | G02B 6/3839 385/137 |
| 2003/0174998 A1 * | 9/2003 | Shevchuk ............ | G02B 6/3885 385/83 |
| 2014/0010499 A1 | 1/2014 | Suematsu et al. | |
| 2019/0346629 A1 | 11/2019 | Morishima | |
| 2020/0049910 A1 | 2/2020 | Hirano et al. | |

FOREIGN PATENT DOCUMENTS

CN          201508424 U        6/2010

OTHER PUBLICATIONS

International Search Report and Written Opinion of the International Searching Authority, International Patent Application No. PCT/US2024/034455, Mailed on Sep. 17, 2024, 12 pages.

* cited by examiner

*Primary Examiner* — Jerry Rahll
(74) *Attorney, Agent, or Firm* — Penilla IP, APC

(57)          ABSTRACT

An optical fiber connector includes a lower plate having a plurality of optical fiber alignment structures. First and second guide element alignment structures are formed in the lower plate. A plurality of optical fibers are respectively disposed in the plurality of optical fiber alignment structures. First and second guide elements are respectively disposed within the first and second guide element alignment structures so as to extend outside of a periphery of the lower plate. A cover plate is secured to the lower plate to hold the plurality of optical fibers within the plurality of optical fiber alignment structures. An upper plate is disposed over each of the cover plate, the first guide element, and the second guide element. The upper plate is secured to the lower plate to hold the first and second guide elements within the first and second guide element alignment structures, respectively.

26 Claims, 26 Drawing Sheets

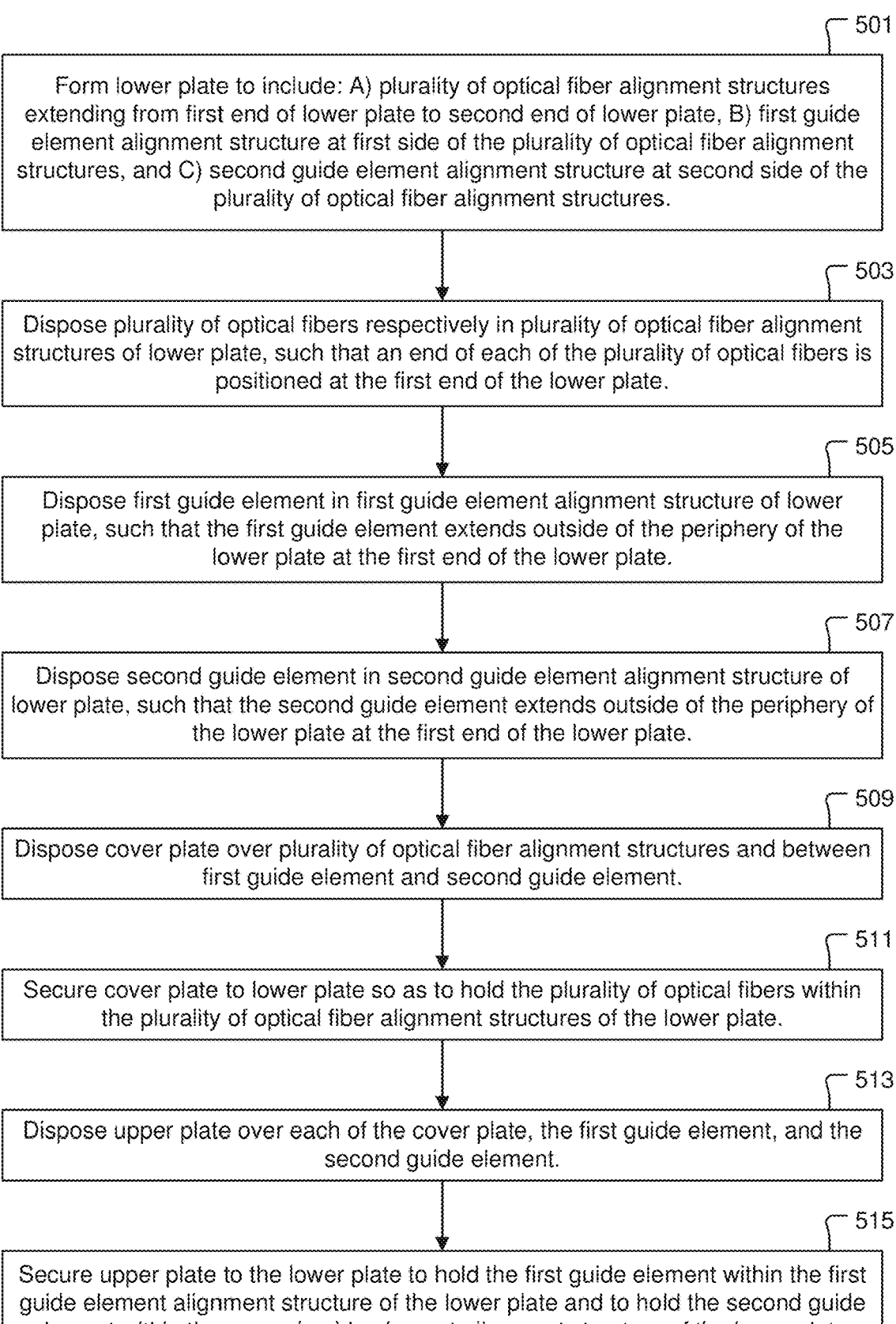

501

Form lower plate to include: A) plurality of optical fiber alignment structures extending from first end of lower plate to second end of lower plate, B) first guide element alignment structure at first side of the plurality of optical fiber alignment structures, and C) second guide element alignment structure at second side of the plurality of optical fiber alignment structures.

503

Dispose plurality of optical fibers respectively in plurality of optical fiber alignment structures of lower plate, such that an end of each of the plurality of optical fibers is positioned at the first end of the lower plate.

505

Dispose first guide element in first guide element alignment structure of lower plate, such that the first guide element extends outside of the periphery of the lower plate at the first end of the lower plate.

507

Dispose second guide element in second guide element alignment structure of lower plate, such that the second guide element extends outside of the periphery of the lower plate at the first end of the lower plate.

509

Dispose cover plate over plurality of optical fiber alignment structures and between first guide element and second guide element.

511

Secure cover plate to lower plate so as to hold the plurality of optical fibers within the plurality of optical fiber alignment structures of the lower plate.

513

Dispose upper plate over each of the cover plate, the first guide element, and the second guide element.

515

Secure upper plate to the lower plate to hold the first guide element within the first guide element alignment structure of the lower plate and to hold the second guide element within the second guide element alignment structure of the lower plate.

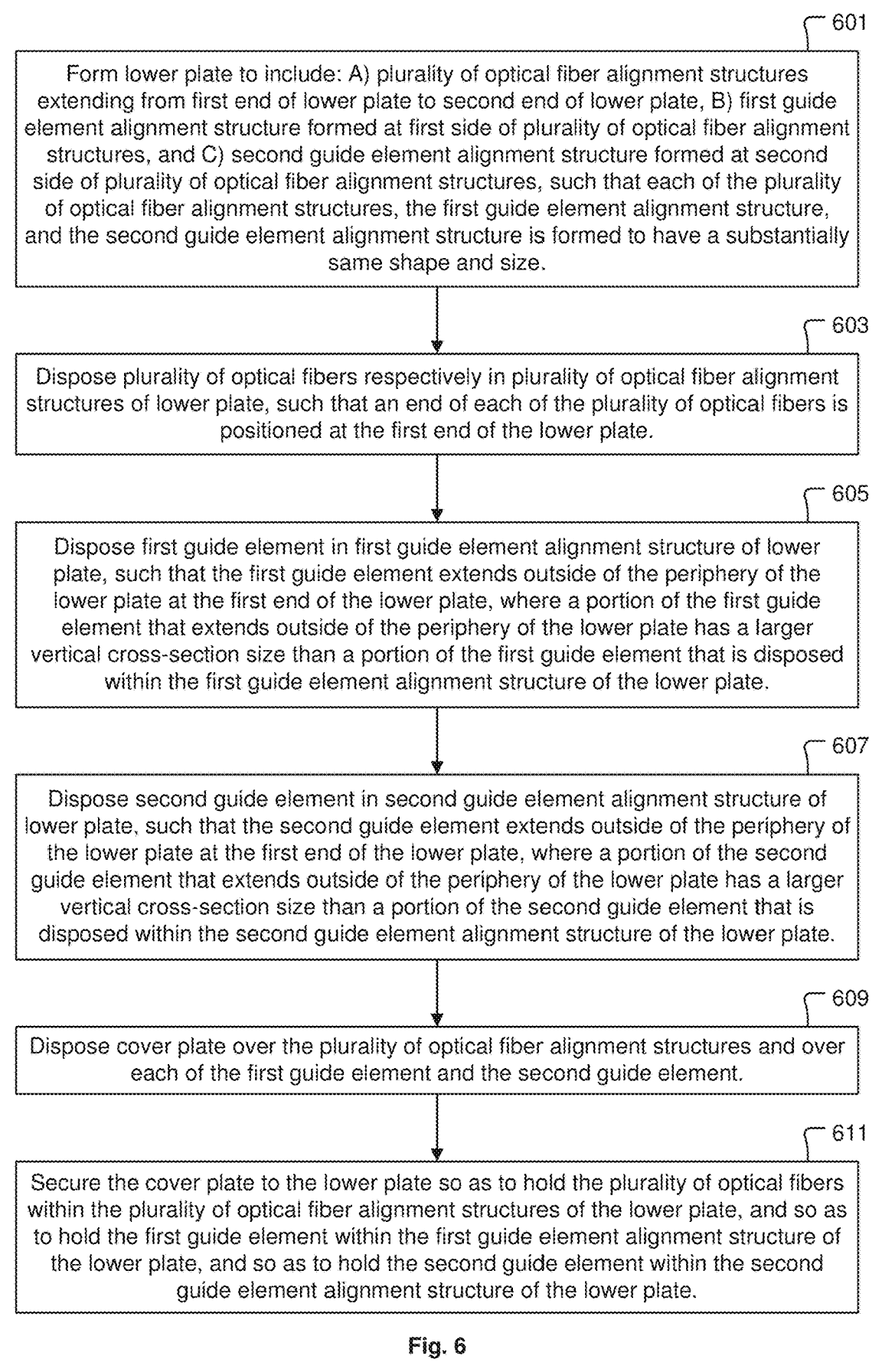

Form lower plate to include: A) plurality of optical fiber alignment structures extending from first end of lower plate to second end of lower plate, B) first guide element alignment structure formed at first side of plurality of optical fiber alignment structures, and C) second guide element alignment structure formed at second side of plurality of optical fiber alignment structures, such that each of the plurality of optical fiber alignment structures, the first guide element alignment structure, and the second guide element alignment structure is formed to have a substantially same shape and size.

603

Dispose plurality of optical fibers respectively in plurality of optical fiber alignment structures of lower plate, such that an end of each of the plurality of optical fibers is positioned at the first end of the lower plate.

605

Dispose first guide element in first guide element alignment structure of lower plate, such that the first guide element extends outside of the periphery of the lower plate at the first end of the lower plate, where a portion of the first guide element that extends outside of the periphery of the lower plate has a larger vertical cross-section size than a portion of the first guide element that is disposed within the first guide element alignment structure of the lower plate.

607

Dispose second guide element in second guide element alignment structure of lower plate, such that the second guide element extends outside of the periphery of the lower plate at the first end of the lower plate, where a portion of the second guide element that extends outside of the periphery of the lower plate has a larger vertical cross-section size than a portion of the second guide element that is disposed within the second guide element alignment structure of the lower plate.

609

Dispose cover plate over the plurality of optical fiber alignment structures and over each of the first guide element and the second guide element.

611

Secure the cover plate to the lower plate so as to hold the plurality of optical fibers within the plurality of optical fiber alignment structures of the lower plate, and so as to hold the first guide element within the first guide element alignment structure of the lower plate, and so as to hold the second guide element within the second guide element alignment structure of the lower plate.

Fig. 6

REFLOWABLE OPTICAL FIBER CONNECTOR

CROSS-REFERENCE TO RELATED APPLICATIONS

This claims priority under 35 U.S.C. 119(e) to U.S. Provisional Patent Application No. 63/524,739, filed on Jul. 3, 2023, the disclosure of which is incorporated herein by reference in its entirety for all purposes.

BACKGROUND OF THE INVENTION

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. The transmission of light through the optical data network includes transmission of light through optical fibers and transmission of light between optical fibers and photonic integrated circuits. Therefore, implementation and operation of optical data communication systems is dependent upon having reliable and efficient solutions for optically connecting optical fibers. It is within this context that the present disclosed embodiments arise.

SUMMARY OF THE INVENTION

In an example embodiment, an optical fiber connector is disclosed. The optical fiber connector includes a lower plate. The lower plate includes a plurality of optical fiber alignment structures extending from a first end of the lower plate to a second end of the lower plate. The lower plate also includes a first guide element alignment structure formed at a first side of the plurality of optical fiber alignment structures. The lower plate also includes a second guide element alignment structure formed at a second side of the plurality of optical fiber alignment structures. The optical fiber connector also includes a plurality of optical fibers respectively disposed in the plurality of optical fiber alignment structures of the lower plate, such that an end of each of the plurality of optical fibers is positioned at the first end of the lower plate. The optical fiber connector also includes a first guide element disposed in the first guide element alignment structure of the lower plate. The first guide element is positioned to extend outside of a periphery of the lower plate at the first end of the lower plate. The optical fiber connector also includes a second guide element disposed in the second guide element alignment structure of the lower plate. The second guide element is positioned to extend outside of the periphery of the lower plate at the first end of the lower plate. The optical fiber connector also includes a cover plate disposed over the plurality of optical fiber alignment structures. The cover plate is positioned between the first guide element and the second guide element. The cover plate is secured to the lower plate to hold the plurality of optical fibers within the plurality of optical fiber alignment structures of the lower plate. The optical fiber connector also includes an upper plate disposed over each of the cover plate, the first guide element, and the second guide element. The upper plate is secured to the lower plate to hold the first guide element within the first guide element alignment structure of the lower plate and the second guide element within the second guide element alignment structure of the lower plate.

In an example embodiment, a method is disclosed for manufacturing an optical fiber connector. The method includes forming a lower plate to include a plurality of optical fiber alignment structures extending from a first end of the lower plate to a second end of the lower plate. A first guide element alignment structure is formed at a first side of the plurality of optical fiber alignment structures, and a second guide element alignment structure is formed at a second side of the plurality of optical fiber alignment structures. The method also includes disposing a plurality of optical fibers respectively in the plurality of optical fiber alignment structures of the lower plate, such that an end of each of the plurality of optical fibers is positioned at the first end of the lower plate. The method also includes disposing a first guide element in the first guide element alignment structure of the lower plate, such that the first guide element extends outside of a periphery of the lower plate at the first end of the lower plate. The method also includes disposing a second guide element in the second guide element alignment structure of the lower plate, such that the second guide element extends outside of the periphery of the lower plate at the first end of the lower plate. The method also includes disposing a cover plate over the plurality of optical fiber alignment structures and between the first guide element and the second guide element. The method also includes securing the cover plate to the lower plate so as to hold the plurality of optical fibers within the plurality of optical fiber alignment structures of the lower plate. The method also includes disposing an upper plate over each of the cover plate, the first guide element, and the second guide element. The method also includes securing the upper plate to the lower plate to hold the first guide element within the first guide element alignment structure of the lower plate and the second guide element within the second guide element alignment structure of the lower plate.

In an example embodiment, a method is disclosed for manufacturing an optical fiber connector. The method includes forming a lower plate to include a plurality of optical fiber alignment structures extending from a first end of the lower plate to a second end of the lower plate. The lower plate is also formed to include a first guide element alignment structure at a first side of the plurality of optical fiber alignment structures and a second guide element alignment structure at a second side of the plurality of optical fiber alignment structures. Each of the plurality of optical fiber alignment structures and each of the first guide element alignment structure and the second guide element alignment structure is formed to have a substantially same shape and size. The method also includes disposing a plurality of optical fibers respectively in the plurality of optical fiber alignment structures of the lower plate, such that an end of each of the plurality of optical fibers is positioned at the first end of the lower plate. The method also includes disposing a first guide element in the first guide element alignment structure of the lower plate, such that the first guide element extends outside of a periphery of the lower plate at the first end of the lower plate. A portion of the first guide element that extends outside of the periphery of the lower plate has a larger vertical cross-section size than a portion of the first guide element that is disposed within the first guide element alignment structure of the lower plate. The method also includes disposing a second guide element in the second guide element alignment structure of the lower plate, such that the second guide element extends outside of the periphery of the lower plate at the first end of the lower plate. A portion of the second guide element that extends outside of the periphery of the lower plate has a larger vertical cross-section size than a portion of the second guide element that is disposed within the second guide element alignment structure of the lower plate. The method also includes disposing a cover plate over the plurality of optical fiber alignment structures and over each of the first guide element and the second guide element. The method also includes securing the cover plate to the lower plate so as to hold the plurality of optical fibers within the plurality of optical fiber alignment structures of the lower plate, and so as to hold the first guide element within the first guide element alignment structure of the lower plate, and so as to hold the second guide element within the second guide element alignment structure of the lower plate.

BRIEF DESCRIPTION OF THE DRAWINGS

FIG. 2F shows a top view of the configuration of FIG. 2D, in accordance with some embodiments.

FIG. 2I shows a top view of the configuration of FIG. 2G, in accordance with some embodiments.

4

Figure 3A:
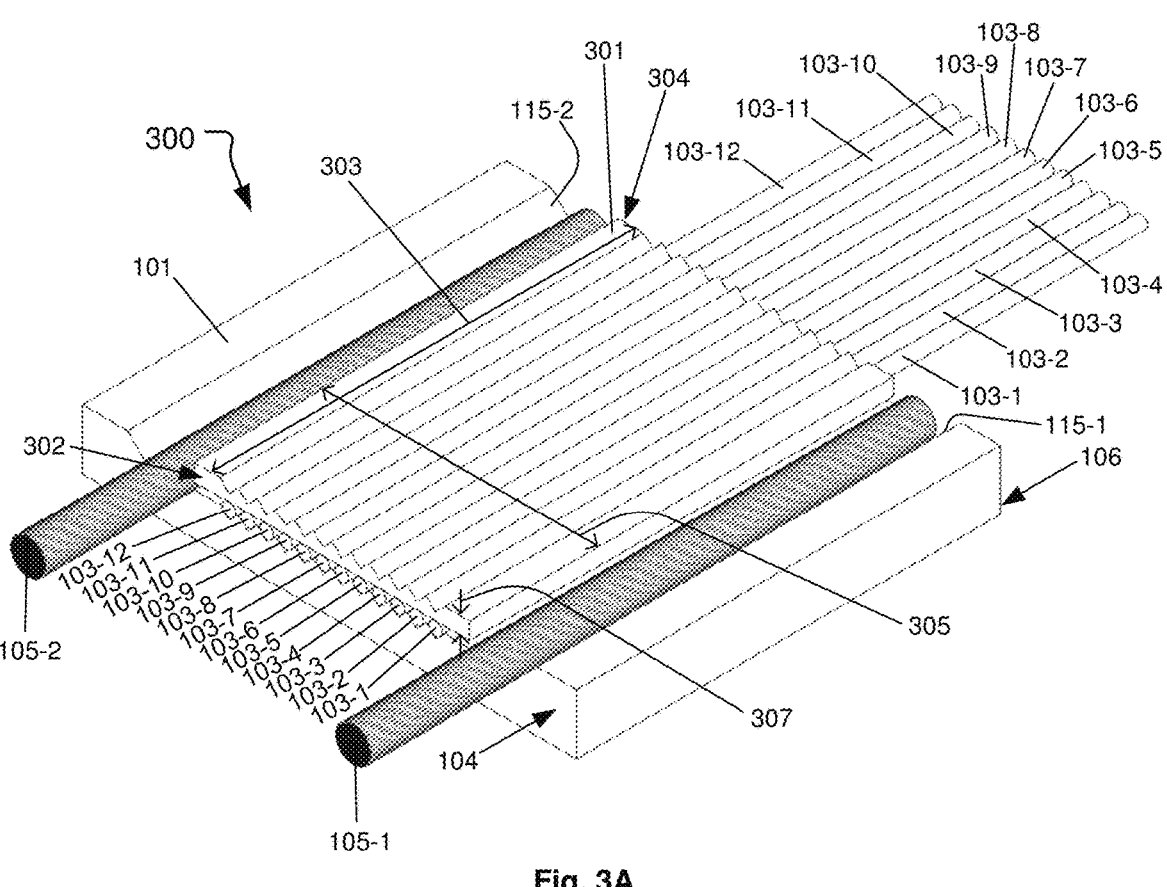
FIG. 3A shows the front-upper isometric view of the configuration of FIG. 2A with a cover plate disposed over the plurality of optical fibers, in accordance with some embodiments.

FIG. 3C shows a top view of the configuration of FIG. 3A, in accordance with some embodiments.

Figure 3B:
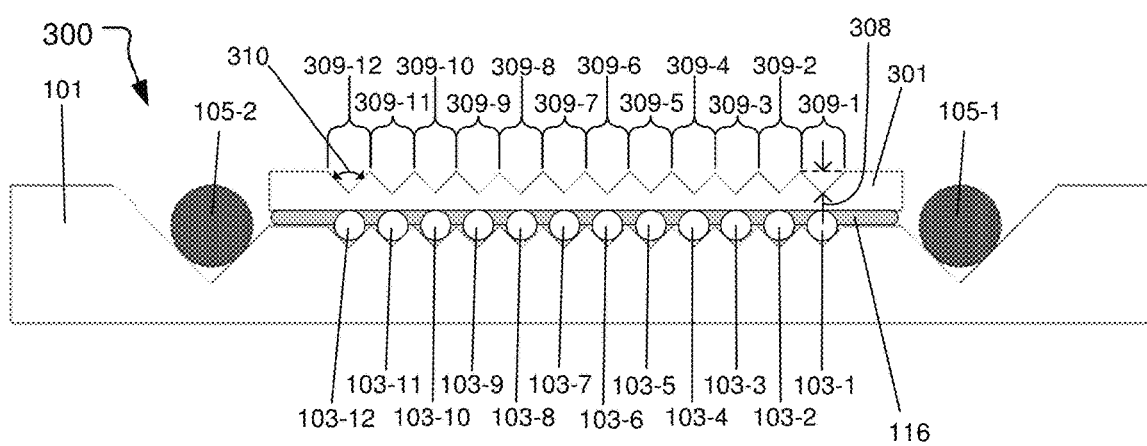
FIG. 3B shows a front view of the configuration of FIG. 3A, in accordance with some embodiments.
Figure 3C:
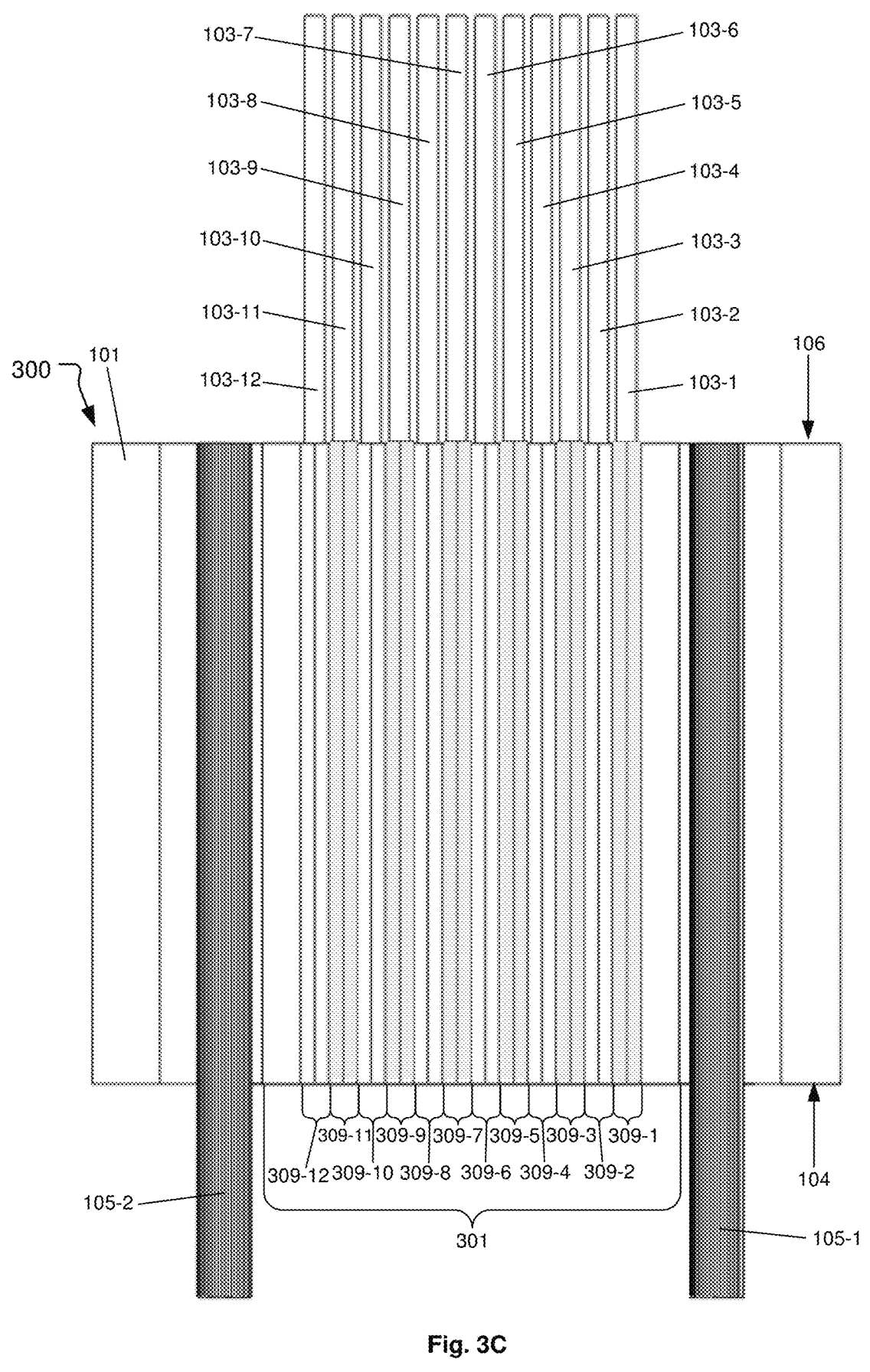
Figures 3D, 3E:
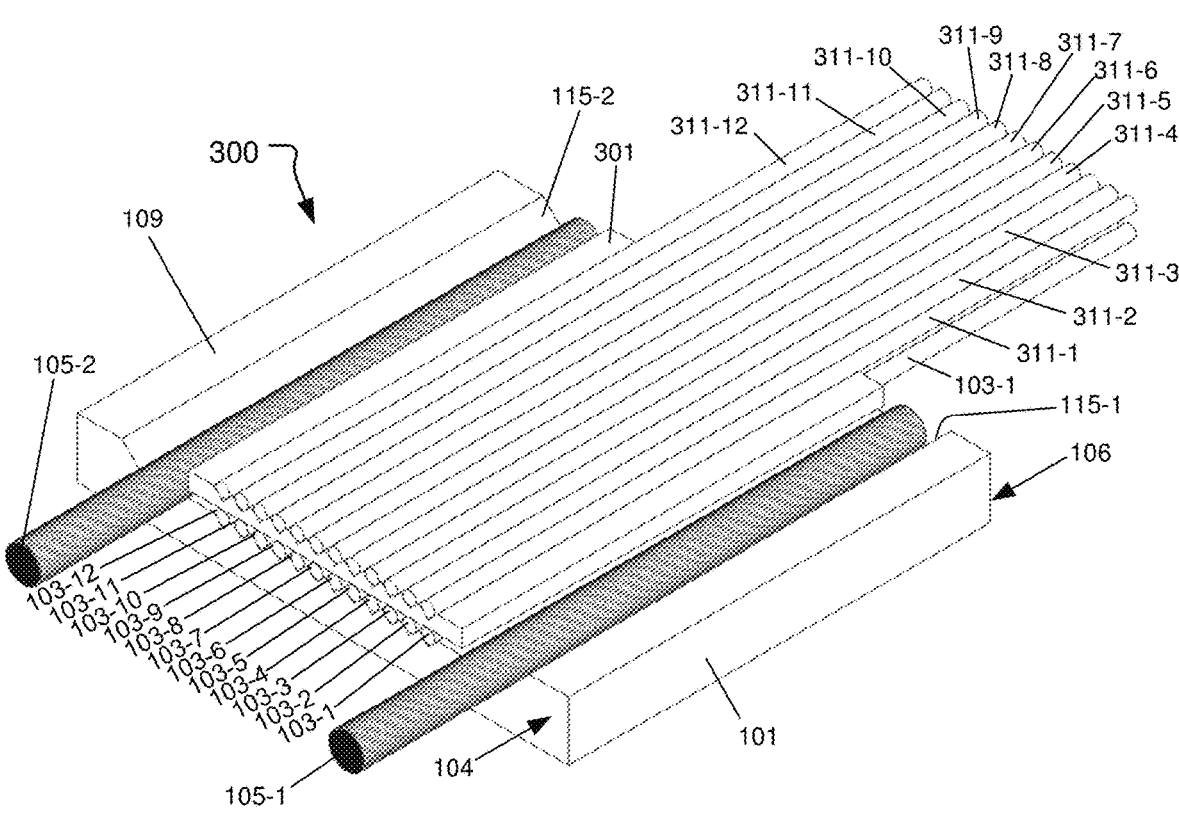

FIG. 3D shows the configuration of FIG. 3A with the second plurality of optical fibers respectively positioned within the v-grooves of the second plurality of optical fiber alignment structures within the cover plate, in accordance with some embodiments.

FIG. 3E shows a front view of the configuration of FIG. 3D, in accordance with some embodiments.

Figure 3F:
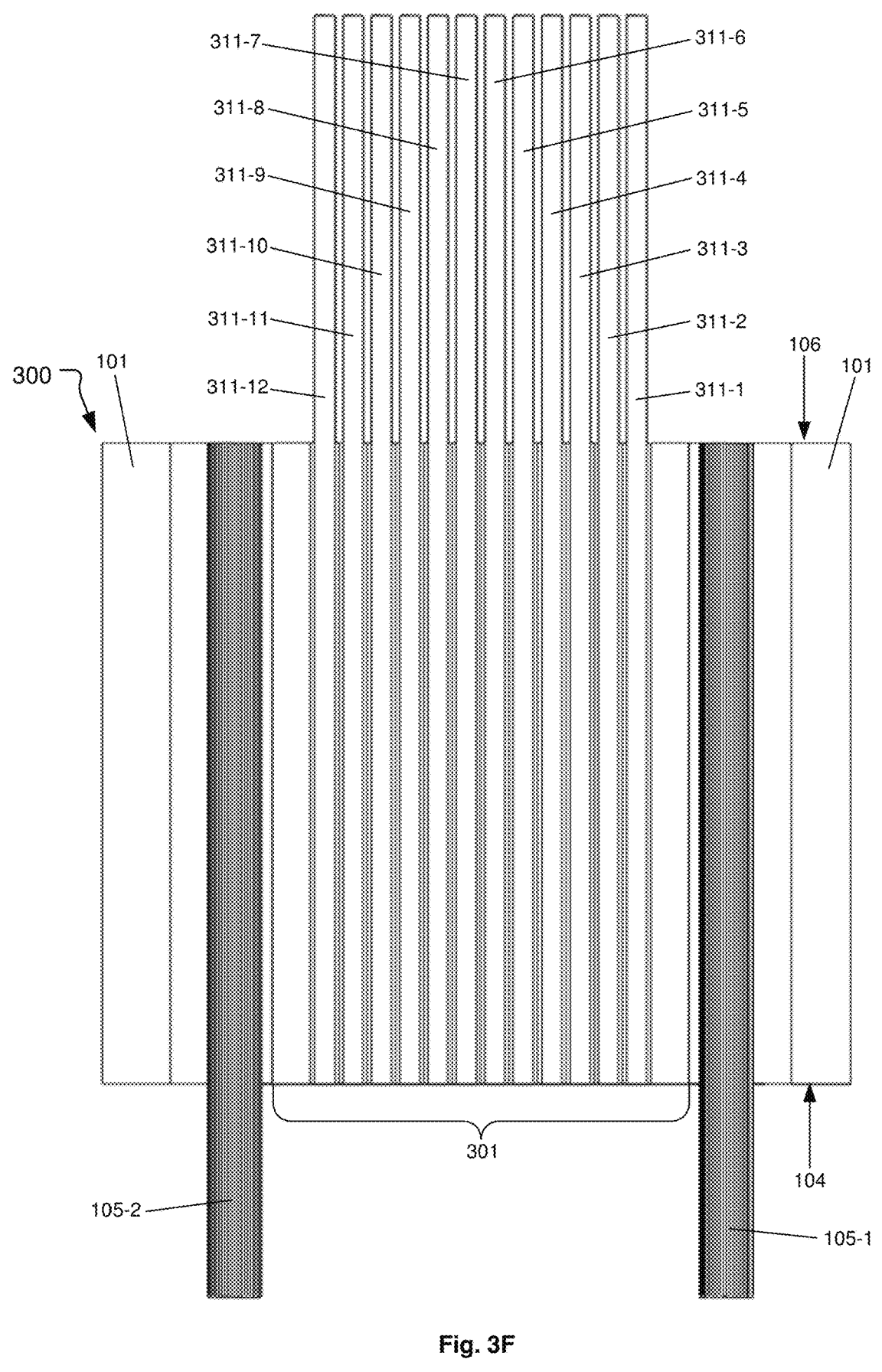

FIG. 3F shows a top view of the configuration of FIG. 3D, in accordance with some embodiments.

Figure 3G:
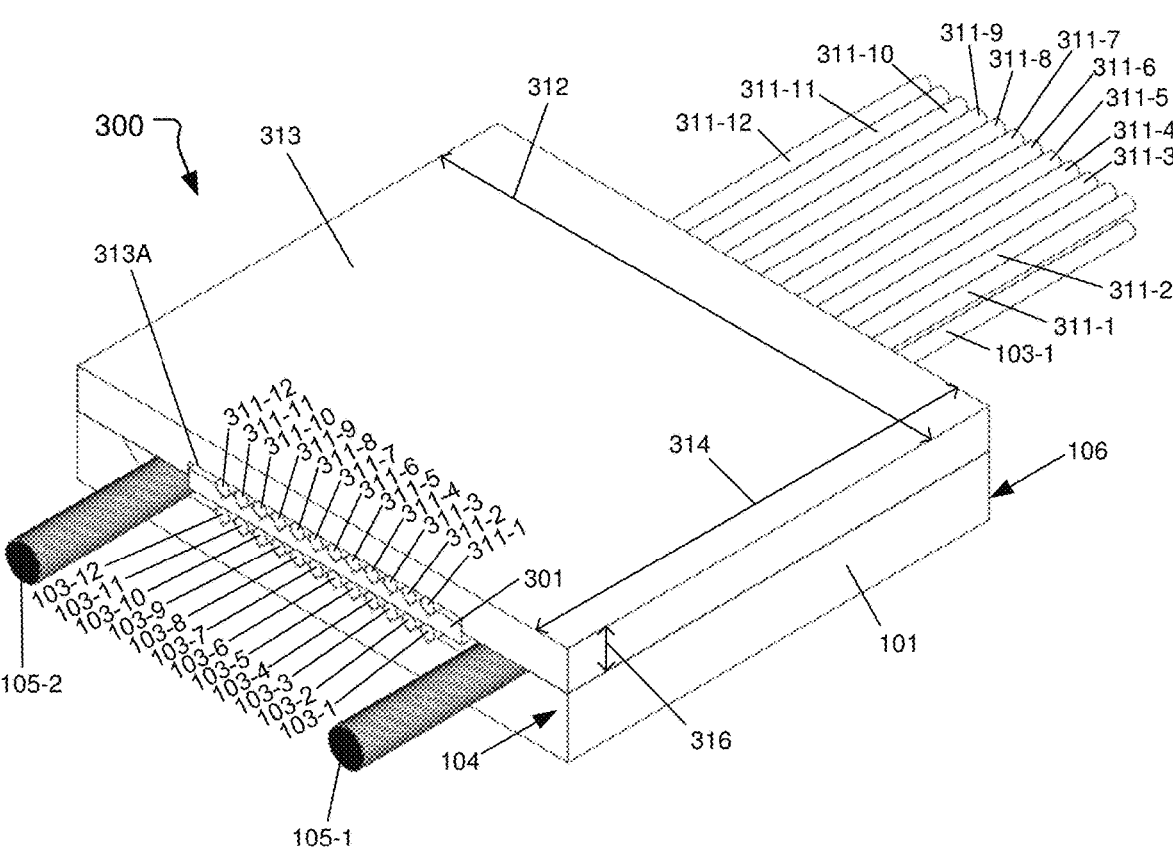

FIG. 3G shows the front-upper isometric view of the configuration of FIG. 3D with an upper plate disposed over each of the cover plate, the second plurality of optical fibers, the first guide element, the second guide element, and the lower plate, in accordance with some embodiments.

Figure 3H:
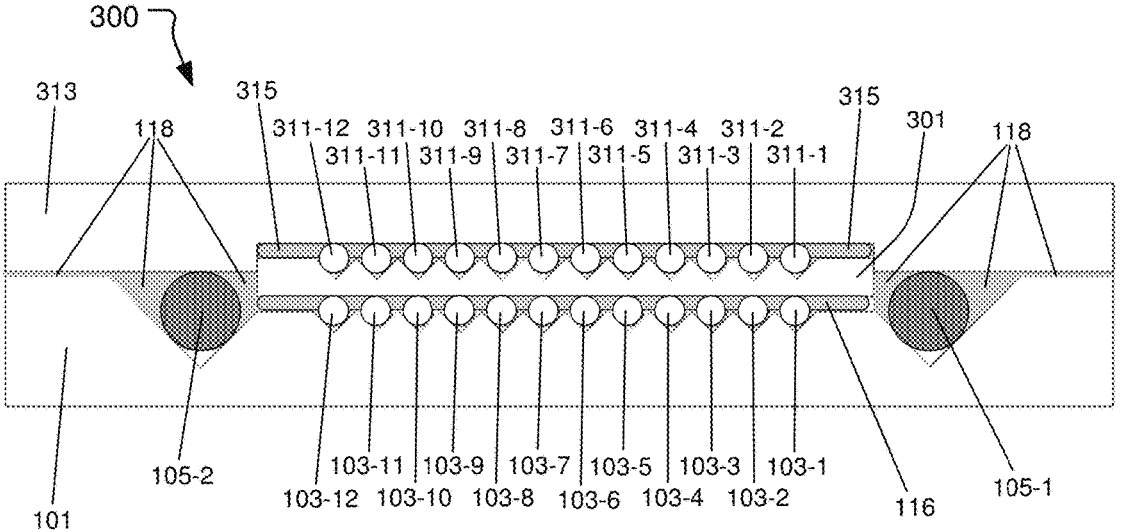

FIG. 3H shows a front view of the configuration of FIG. 3G, in accordance with some embodiments.

Figure 3I:
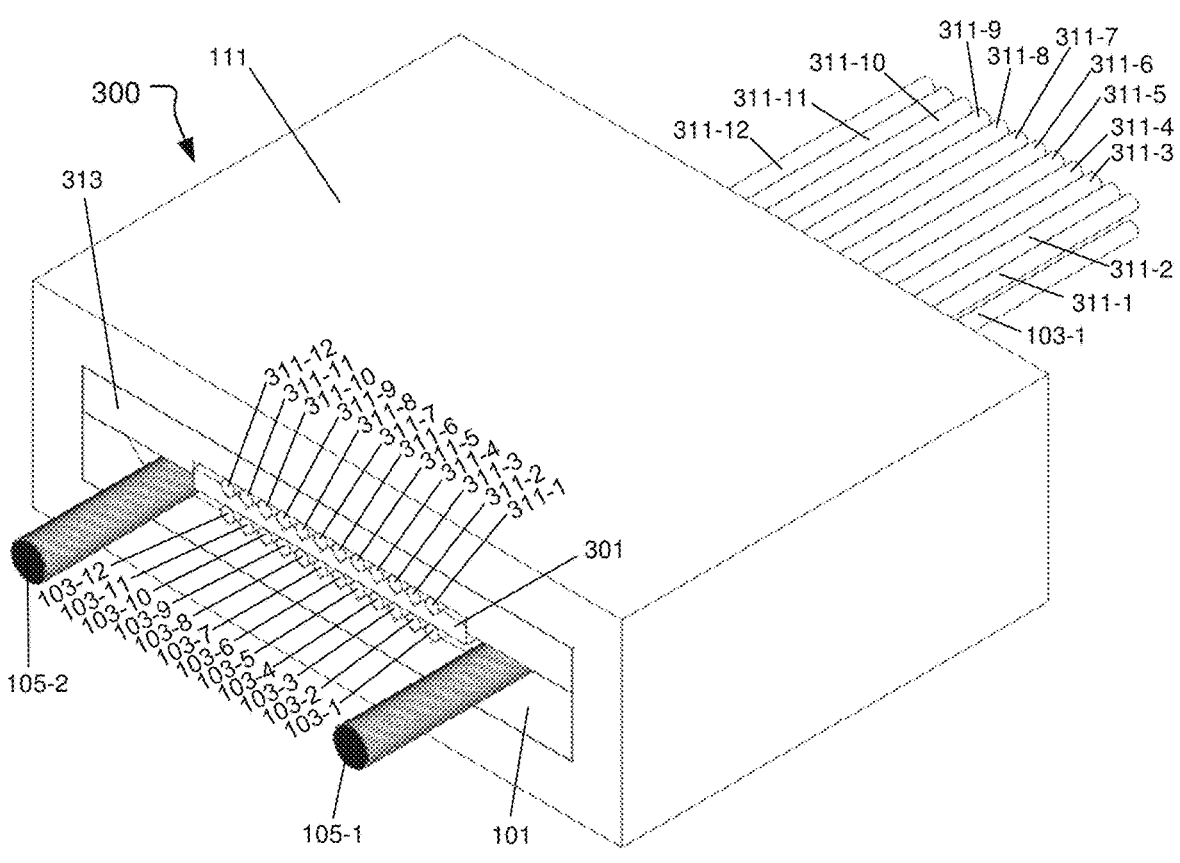

FIG. 3I shows a front-upper isometric view of the optical fiber connector, in accordance with some embodiments.

Figure 3J:
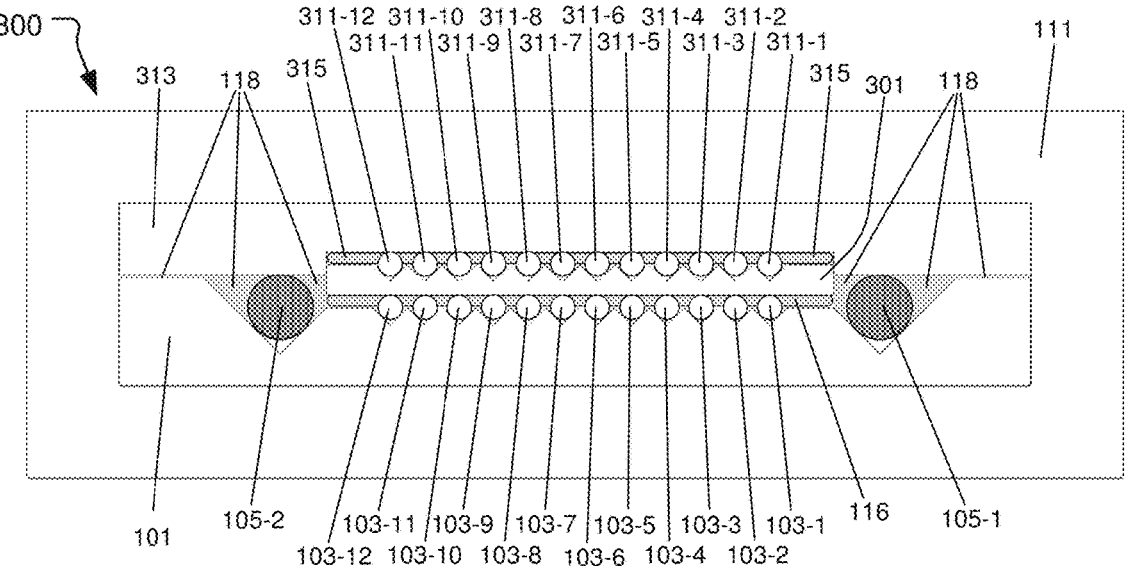

FIG. 3J shows a front view of the optical fiber connector, in accordance with some embodiments.

Figure 3K:
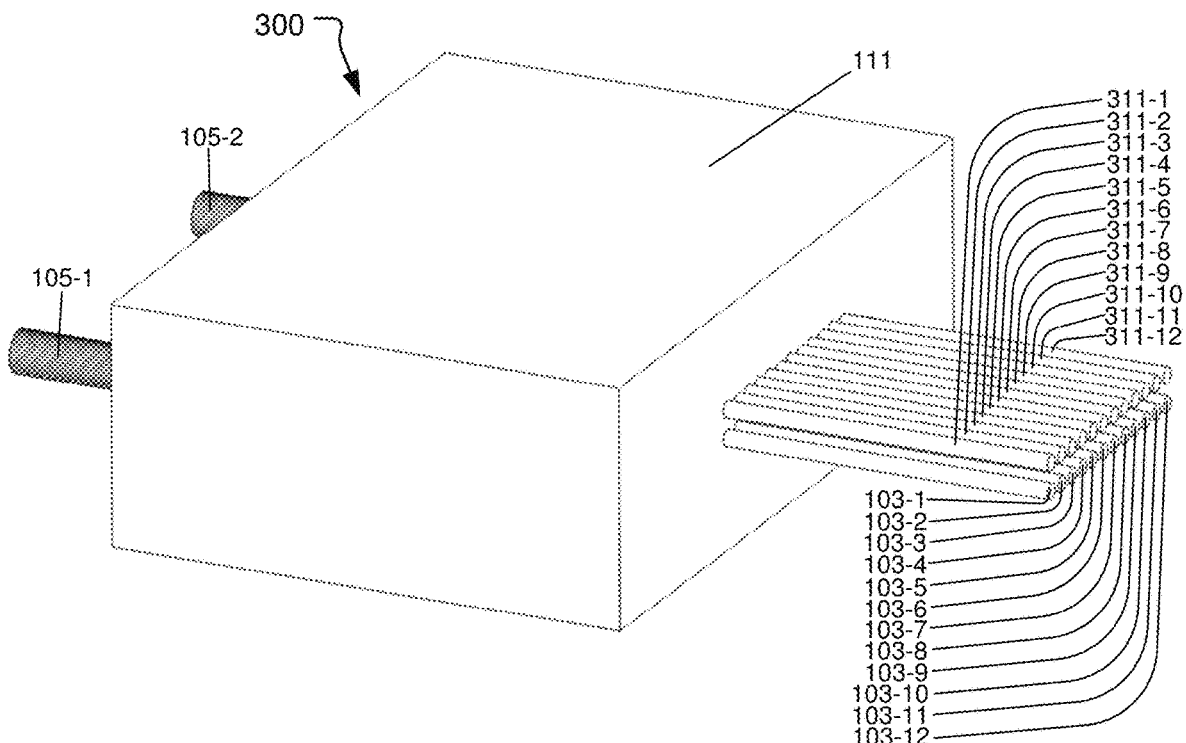

FIG. 3K shows a back-upper perspective view of the optical fiber connector, in accordance with some embodiments.

Figure 4A:
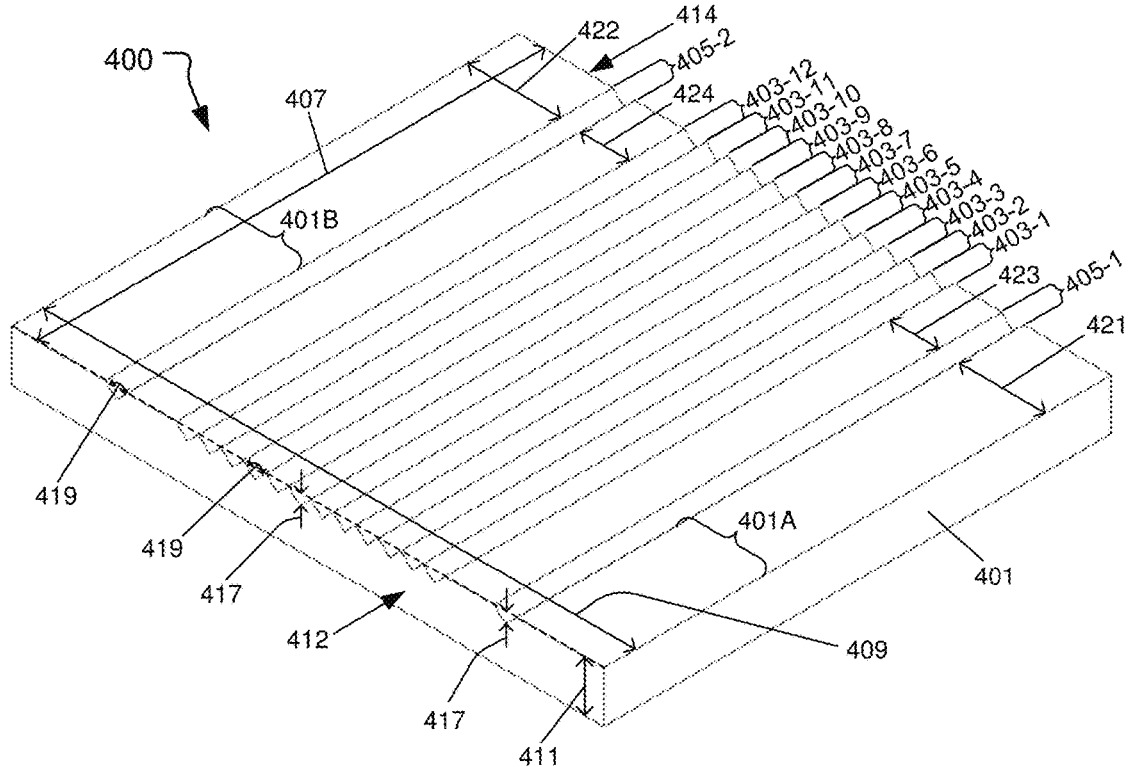

FIG. 4A shows a front-upper isometric view of a lower plate of the optical fiber connector, in accordance with some embodiments.

Figures 4B, 4C:
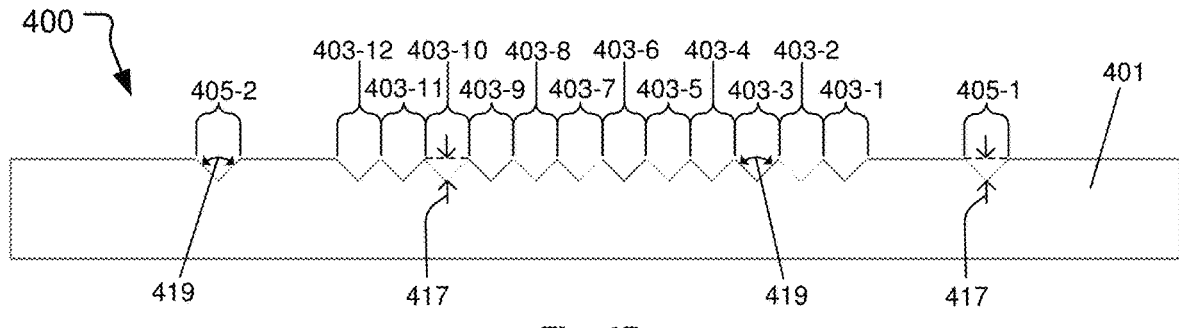

FIG. 4B shows a front view of the lower plate of the optical fiber connector, in accordance with some embodiments.

FIG. 4C shows a top view of the lower plate of the optical fiber connector, in accordance with some embodiments.

Figure 4D:
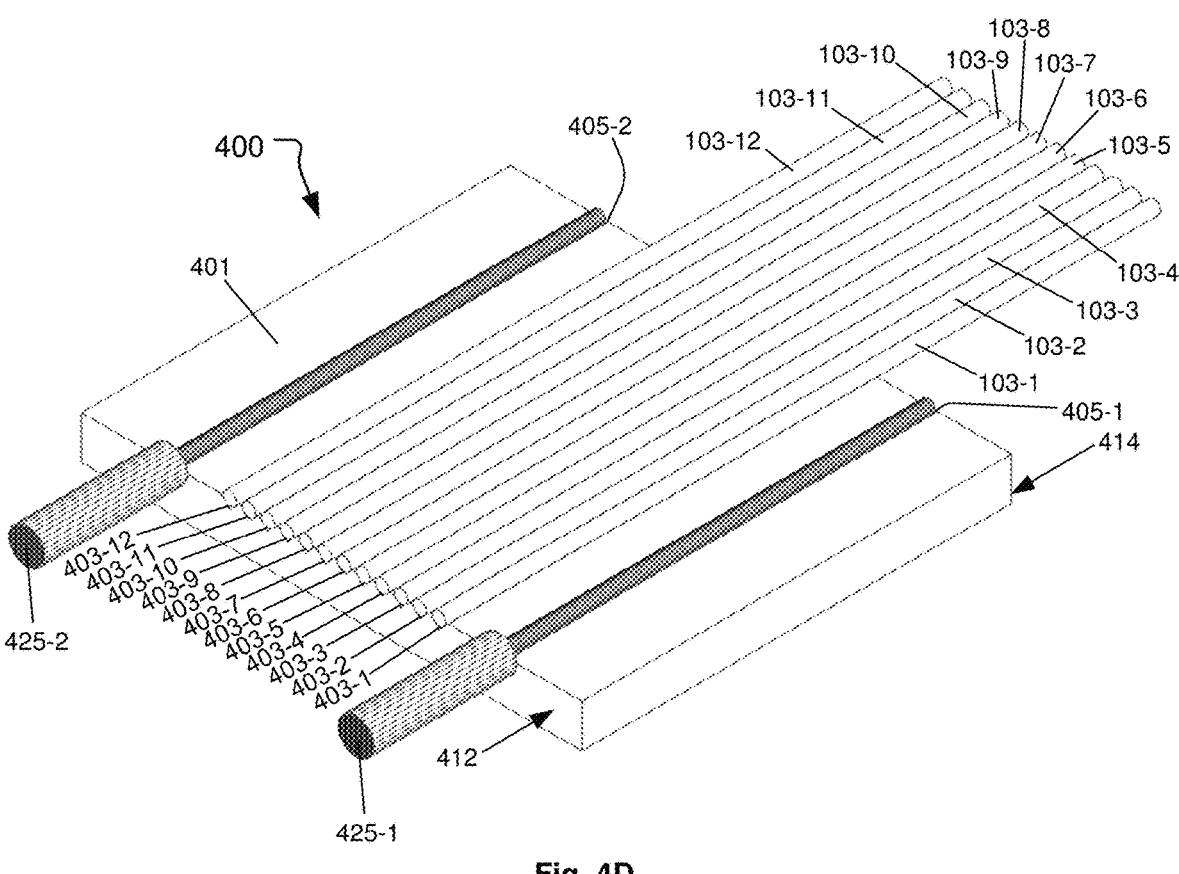

FIG. 4D shows the front-upper isometric view of the lower plate of FIG. 4A with the plurality of optical fibers respectively positioned within the v-grooves of the plurality of optical fiber alignment structures within the lower plate, in accordance with some embodiments.

Figure 4E:
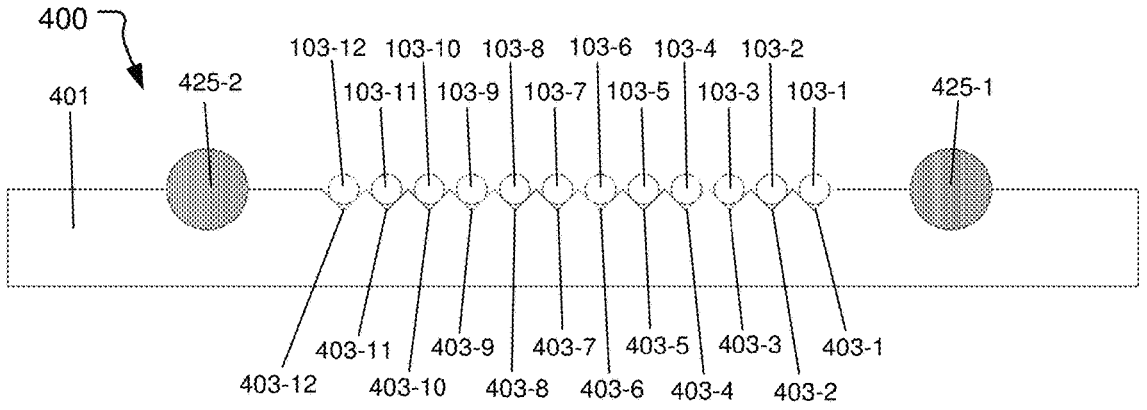

FIG. 4E shows a front view of the configuration of FIG. 4D, in accordance with some embodiments.

Figure 4F:
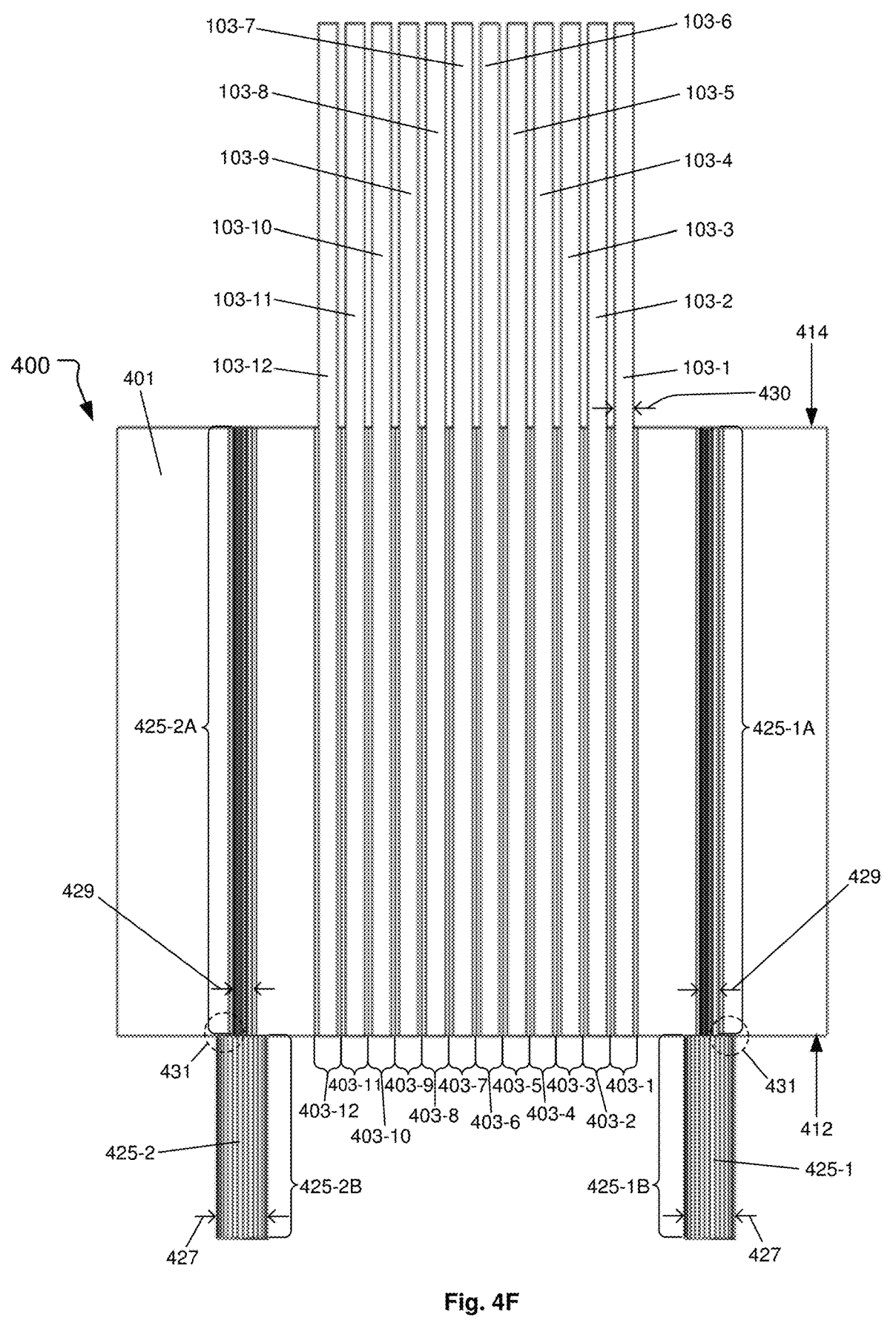

FIG. 4F shows a top view of the configuration of FIG. 4D, in accordance with some embodiments.

Figure 4G:
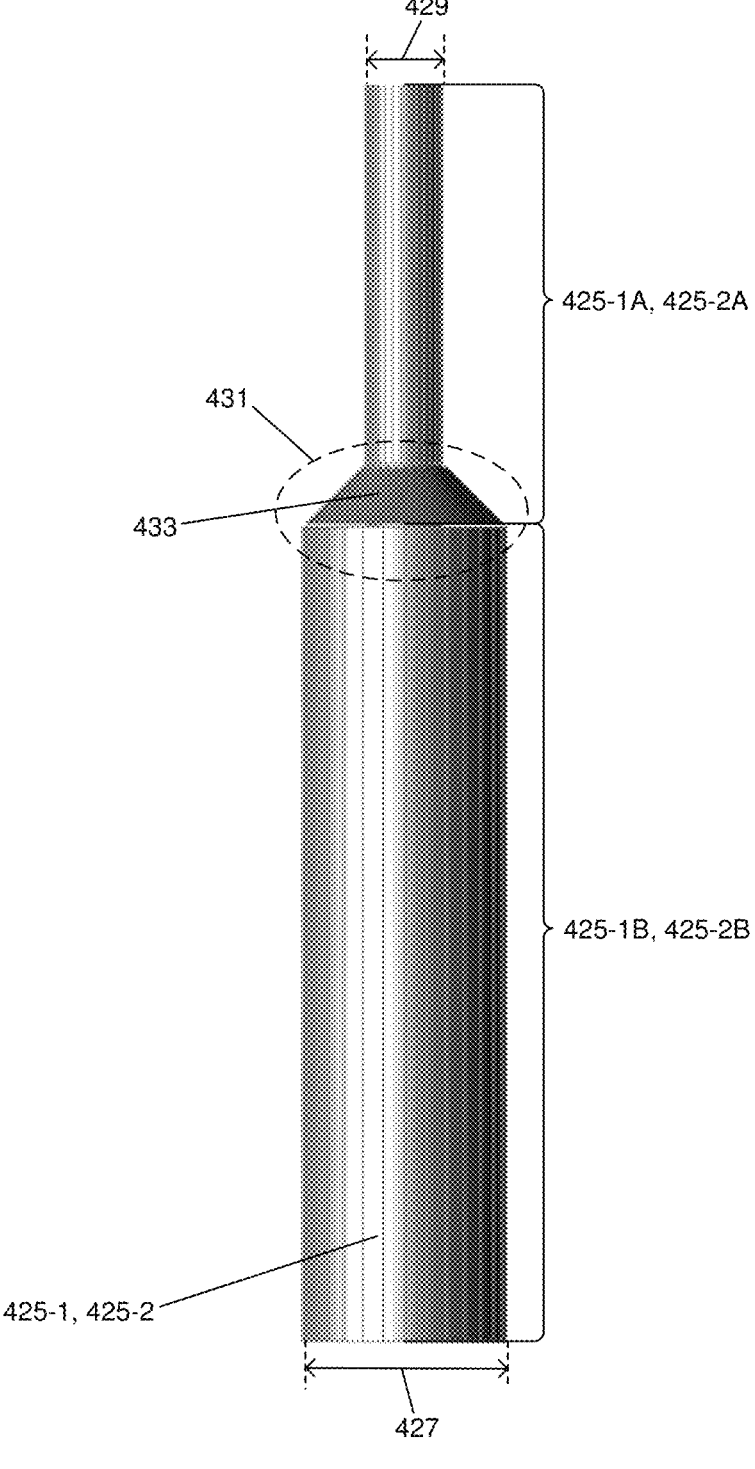

FIG. 4G shows a top view of a portion of the first guide element and the second guide element, in accordance with some embodiments.

Figure 4H:
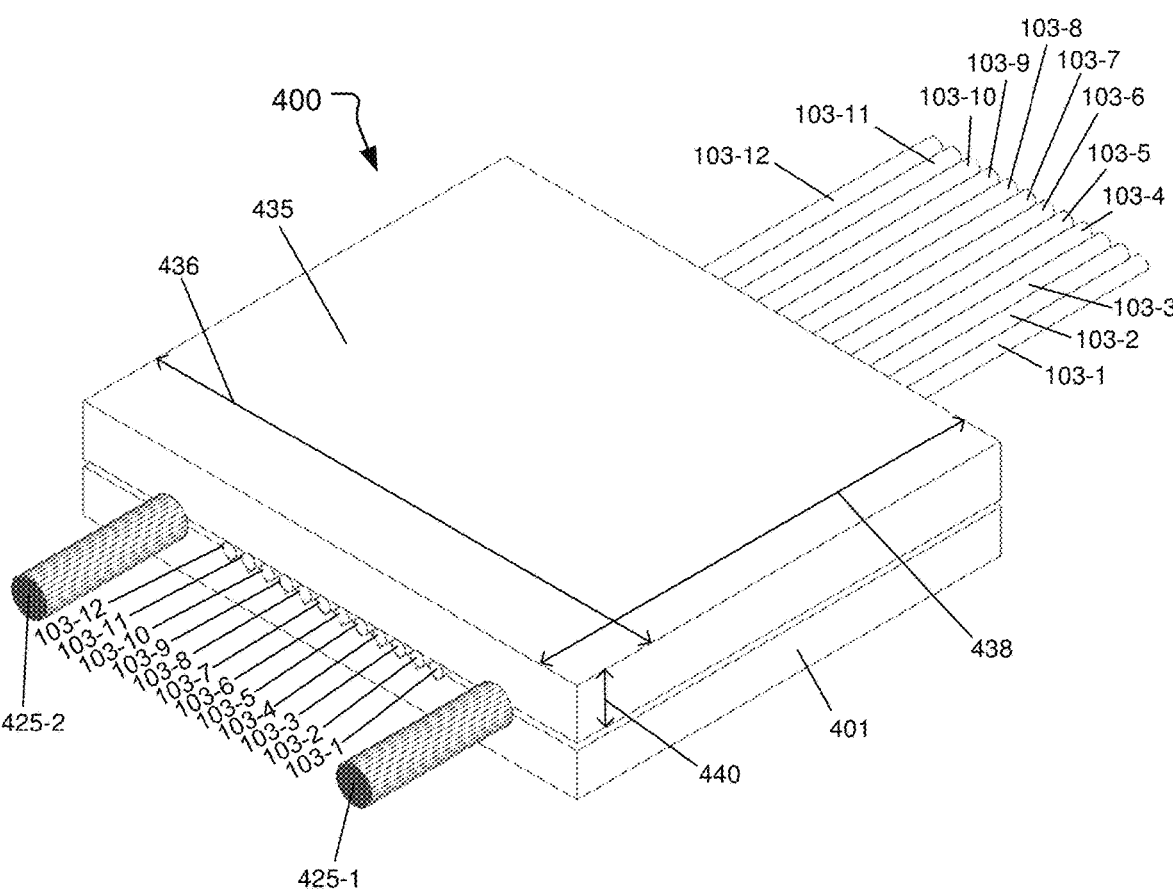

FIG. 4H shows the front-upper isometric view of the configuration of FIG. 4D with a cover plate disposed over the plurality of optical fibers and over the lower plate, in accordance with some embodiments.

Figure 4I:
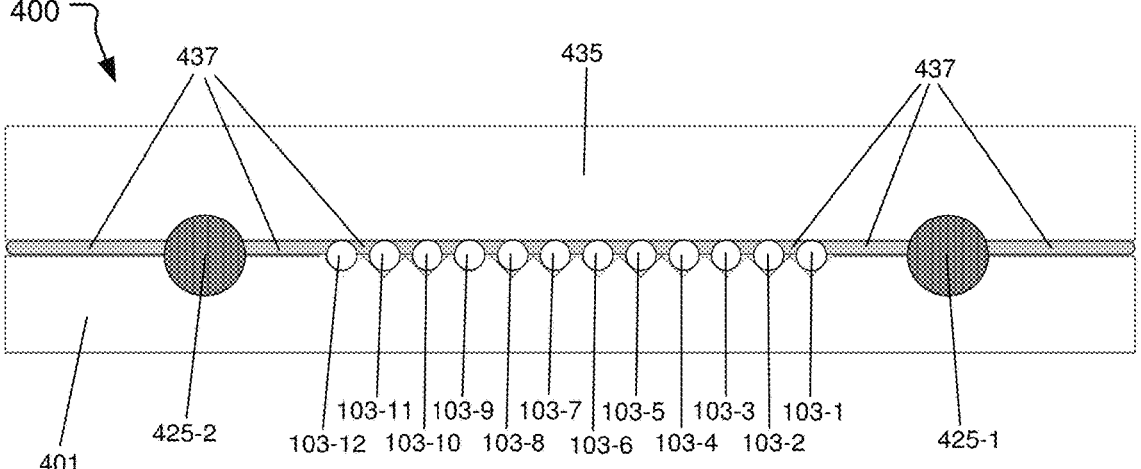

FIG. 4I shows a front view of the configuration of FIG. 4H, in accordance with some embodiments.

Figure 4J:
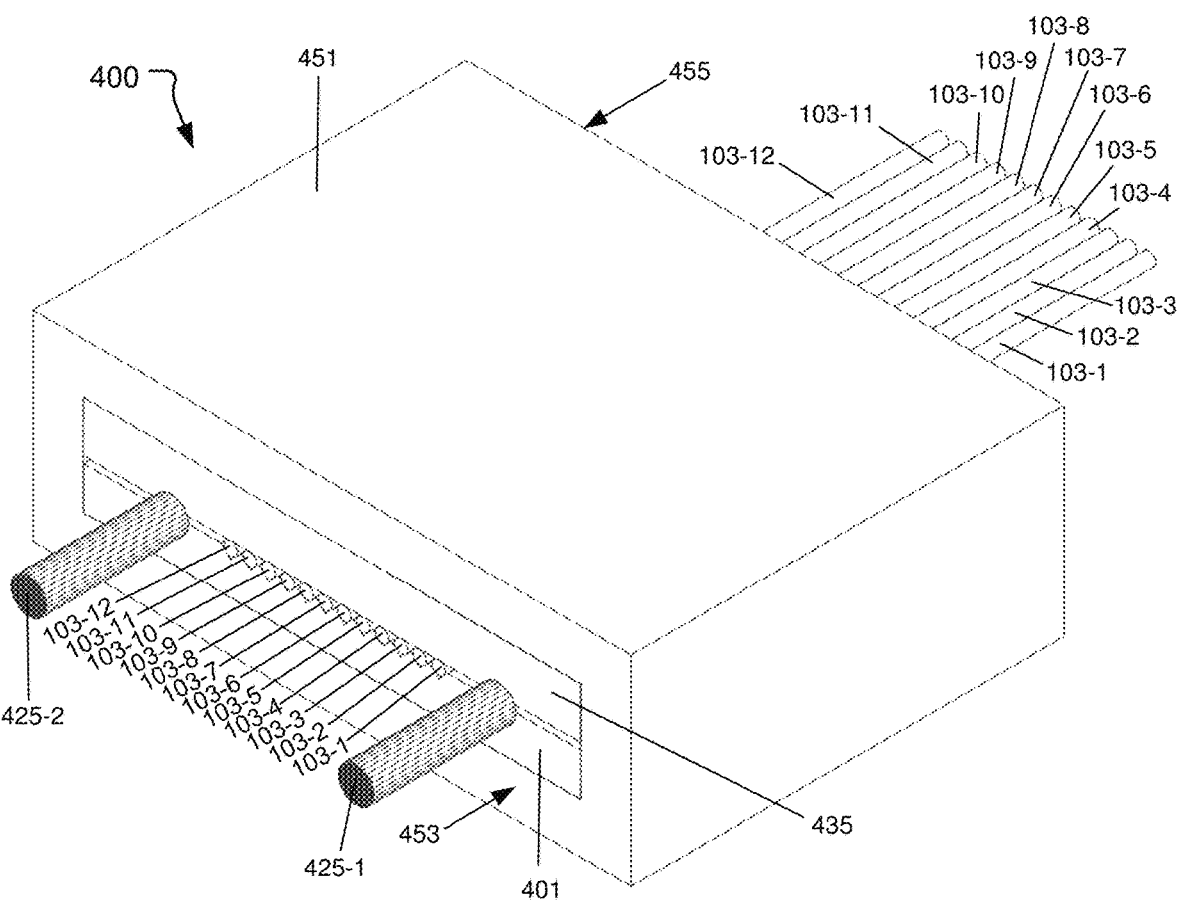

FIG. 4J shows a front-upper isometric view of the configuration of the optical fiber connector with an outer sheath formed around an outside of the cover plate and around an outside of the lower plate, in accordance with some embodiments.

Figure 4K:
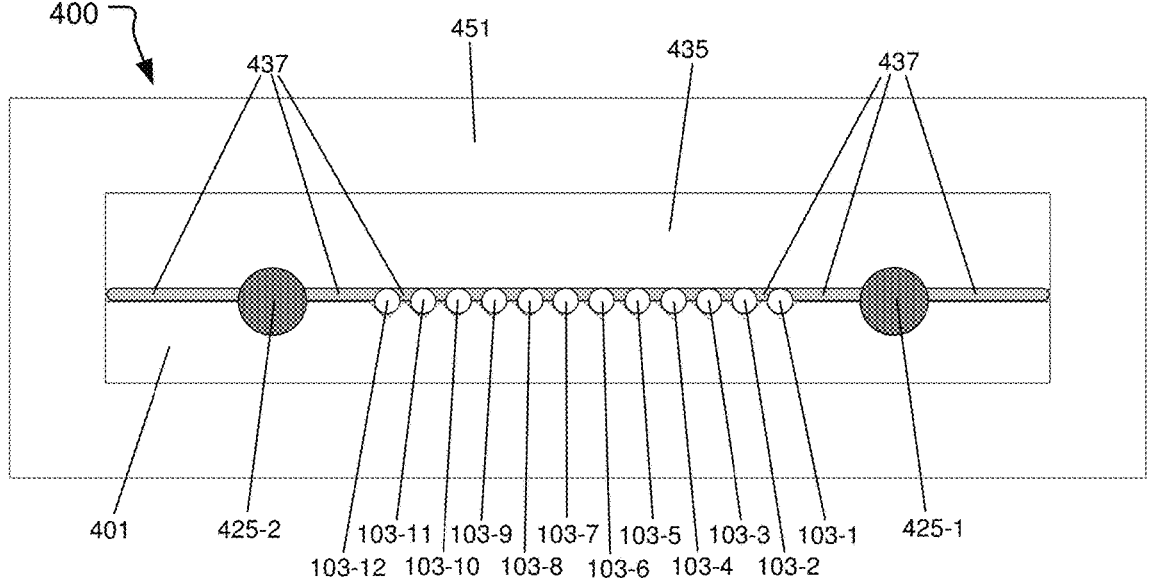

FIG. 4K shows a front view of the optical fiber connector as shown in FIG. 4J, in accordance with some embodiments.

Figures 4L, 4M:
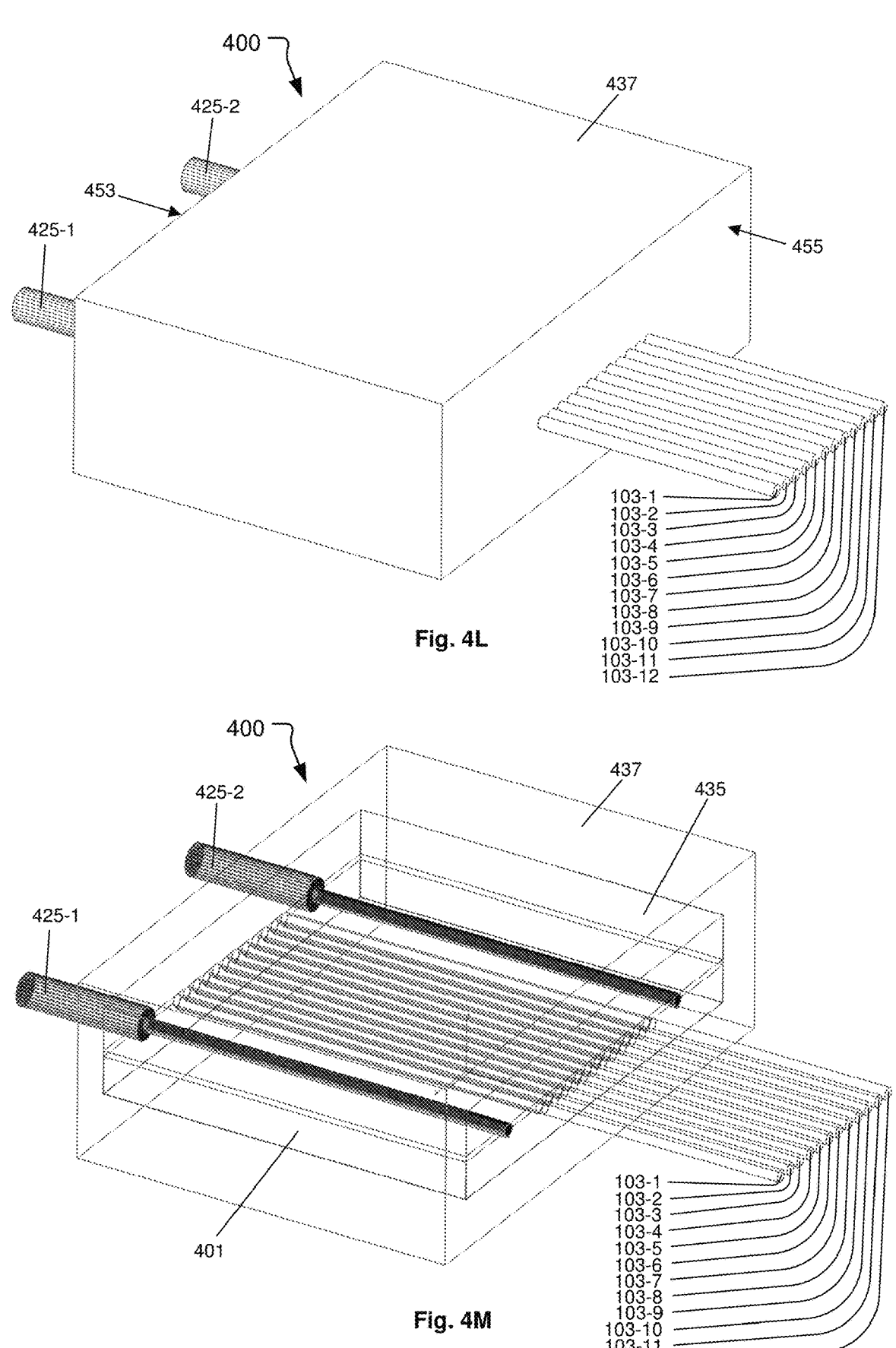

FIG. 4L shows a back-upper perspective view of the configuration of the optical fiber connector as shown in FIG. 4J, in accordance with some embodiments.

FIG. 4M shows a transparent view of the optical fiber connector as shown in FIG. 4L, in accordance with some embodiments.

FIG. 5 shows a flowchart of a method for manufacturing an optical fiber connector, in accordance with some embodiments.

FIG. 6 shows a flowchart of a method for manufacturing an optical fiber connector, in accordance with some embodiments.

DETAILED DESCRIPTION OF THE INVENTION

In the following description, numerous specific details are set forth in order to provide an understanding of the embodiments disclosed herein. It will be apparent, however, to one skilled in the art that the embodiments disclosed herein may be practiced without some or all of these specific details. In other instances, well known process operations have not been described in detail in order not to unnecessarily obscure the disclosed embodiments.

Conventional optical fiber connectors, such as mechanical transfer (MT) ferrules, are made of plastic, such as polyphenylene sulfide (PPS). These plastic optical fiber connectors cannot withstand the high temperature, e.g., greater than about 250° Celsius (C), associated with solder reflow processes. In many cases, the plastic optical fiber connectors may deform when exposed to the high temperature of the solder reflow process, which in turn causes optical misalignment of the optical fibers within the plastic optical fiber connectors with other interfacing optical devices, such as other optical fibers, optical waveguides, spot size converters, etc. The high-temperature-induced deformation of the plastic optical fiber connectors can significantly increase the optical insertion loss associated with use of the plastic optical fiber connectors. Moreover, prior attempts to use a high-temperature-resistant plastic material to form the optical fiber connectors has not proven to be reliable. Therefore, a need exists for an optical fiber connector that is able to reliably withstand the high-temperature of the solder reflow process without undergoing temperature-induced deformation and causing an associated increase in optical insertion loss through the optical fiber connector.

Embodiments are disclosed herein for optical fiber connectors that are capable of reliably withstanding the high-temperature, e.g., greater than or equal to about 250° C., of the solder reflow process without deformation and without deformation-induced optical insertion loss. In this manner, the optical fiber connectors disclosed herein are able to be placed within the solder reflow chamber, which significantly improves the efficiency and options for fabrication process flow for electro-optic chips and/or packages to which the optical fiber connectors are attached. In some embodiments, the optical fiber connectors disclosed herein have a outer form-factor similar to that of an MT ferrule. In some embodiments, the optical fiber connectors disclosed herein are compatible with MT and/or multi-fiber push-on (MPO) connections. In various embodiments, the optical fiber connectors disclosed herein can be configured for compatibility with essentially any optical fiber connector form-factor and connection technology.

Figure 1A:
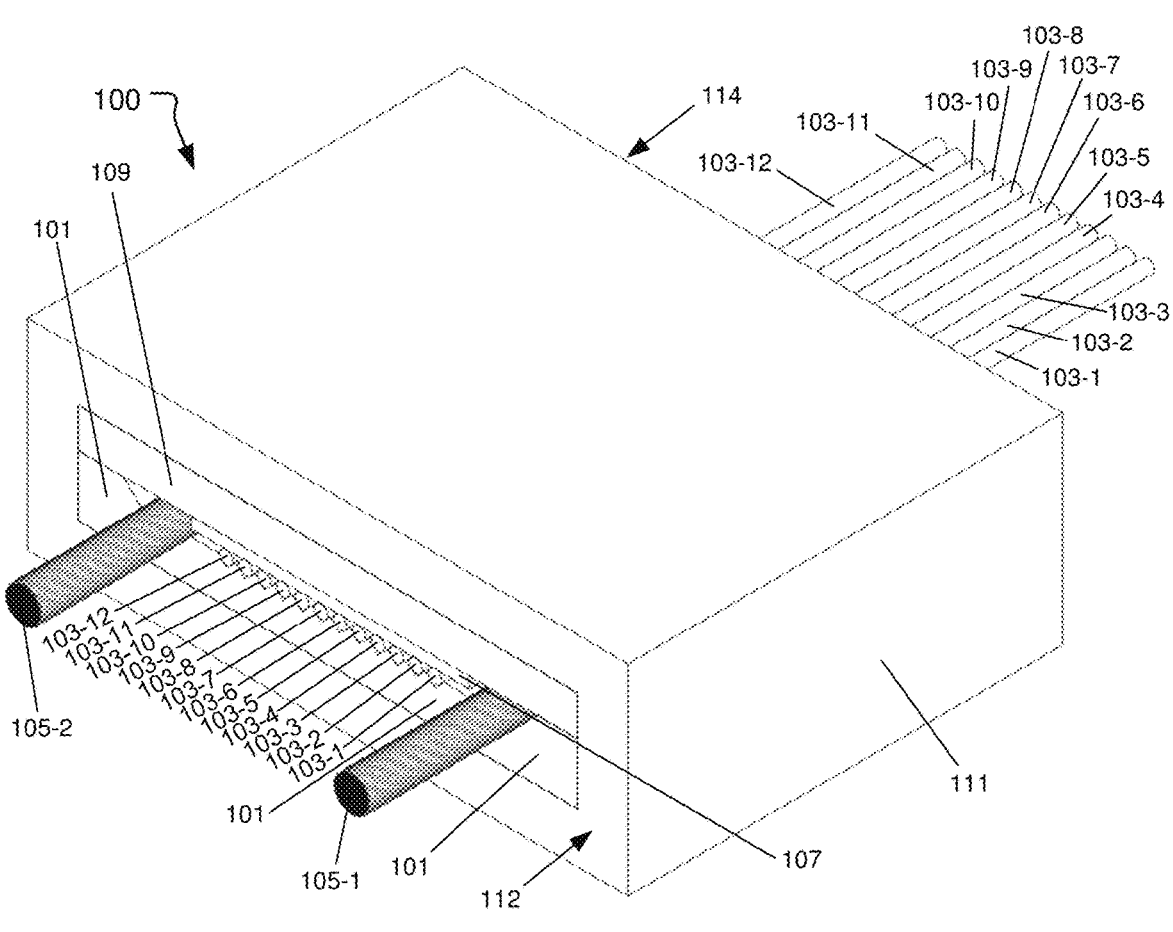
FIG. 1A shows a front-upper isometric view of an optical fiber connector, in accordance with some embodiments.

FIG. 1A shows a front-upper isometric view of an optical fiber connector 100, in accordance with some embodiments. The optical fiber connector 100 includes a lower plate 101 and a cover plate 107. A plurality of optical fibers 103-1 to 103-12 are disposed between the lower plate 101 and the cover plate 107. It should be understood that the plurality of optical fibers 103-1 to 103-12 is not limited to the 12 optical fibers 103-1 to 103-12 shown in FIG. 1A, but may be less than or greater than 12 in various embodiments of the optical fiber connector 100. An upper plate 109 is disposed over the cover plate 107 and over the lower plate 101. A first guide element 105-1 and a second guide element 105-2 are disposed between the upper plate 109 and the lower plate 101. The first guide element 105-1 and a second guide element 105-2 extend outward from an optical connection end 112 of the optical fiber connector 100. The first guide element 105-1 and a second guide element 105-2 are configured to insert into corresponding slots within another optical connector to which the optical fiber connector 100 is connected. In some embodiments, the optical fiber connector 100 is considered to have a male-type connector configuration. An outer sheath 111 is formed around the upper plate 109 and the lower plate 101 to encase the optical fiber connector 100, while leaving optical cores of the plurality of optical fibers 103-1 to 103-12 exposed at the optical connection end 112 of the optical fiber connector 100. The outer sheath 111 is configured to have an outer form-factor that provides for connection with another optical connector to which the optical fiber connector 100 is connected. The outer sheath 111 is also configured to provide mechanical strength and impact protection to the optical fiber connector 100.

Figure 1B:
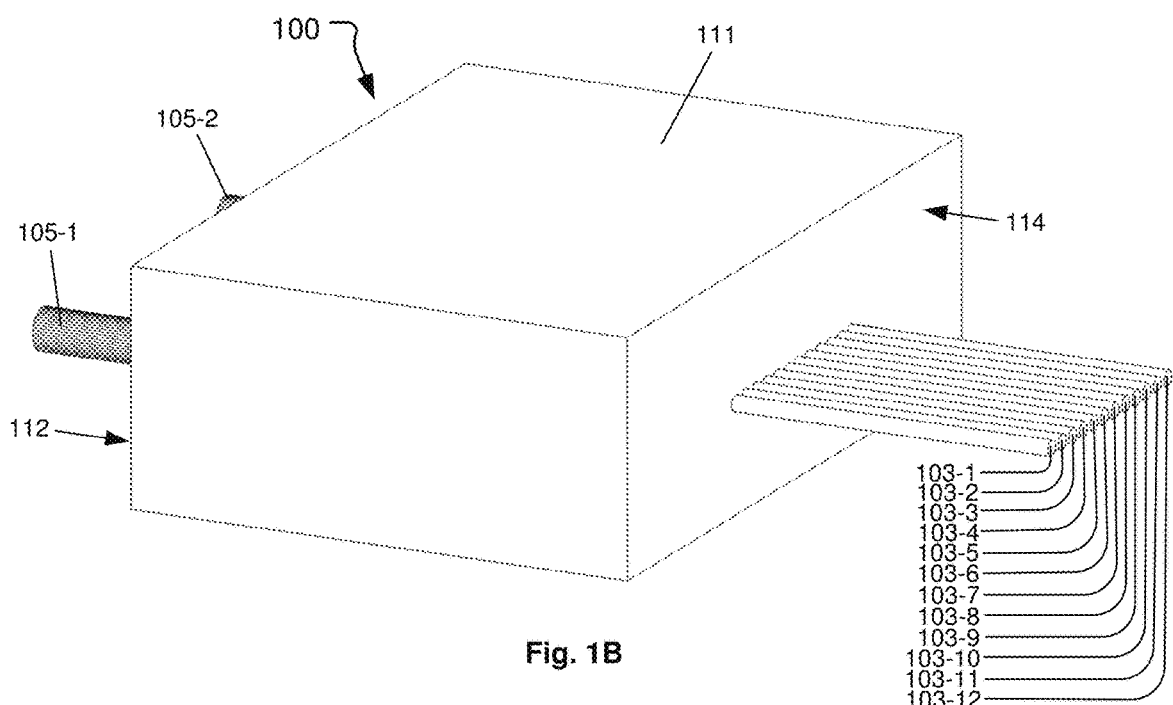
FIG. 1B shows a back-upper perspective view of the optical fiber connector of FIG. 1A, in accordance with some embodiments.

FIG. 1B shows a back-upper perspective view of the optical fiber connector 100, in accordance with some embodiments. The plurality of optical fibers 103-1 to 103-12 extend through the optical fiber connector 100 and out of a back end 114 of the optical fiber connector 100. In various embodiments, the plurality of optical fibers 103-1 to 103-12 extend out of the back end 114 of the optical fiber connector 100 in either a pigtail configuration or a ribbon configuration. However, in some embodiments, the plurality of optical fibers 103-1 to 103-12 extend out of the back end 114 of the optical fiber connector 100 in a loosely separated fiber-to-fiber configuration.

Figures 1C, 1D:
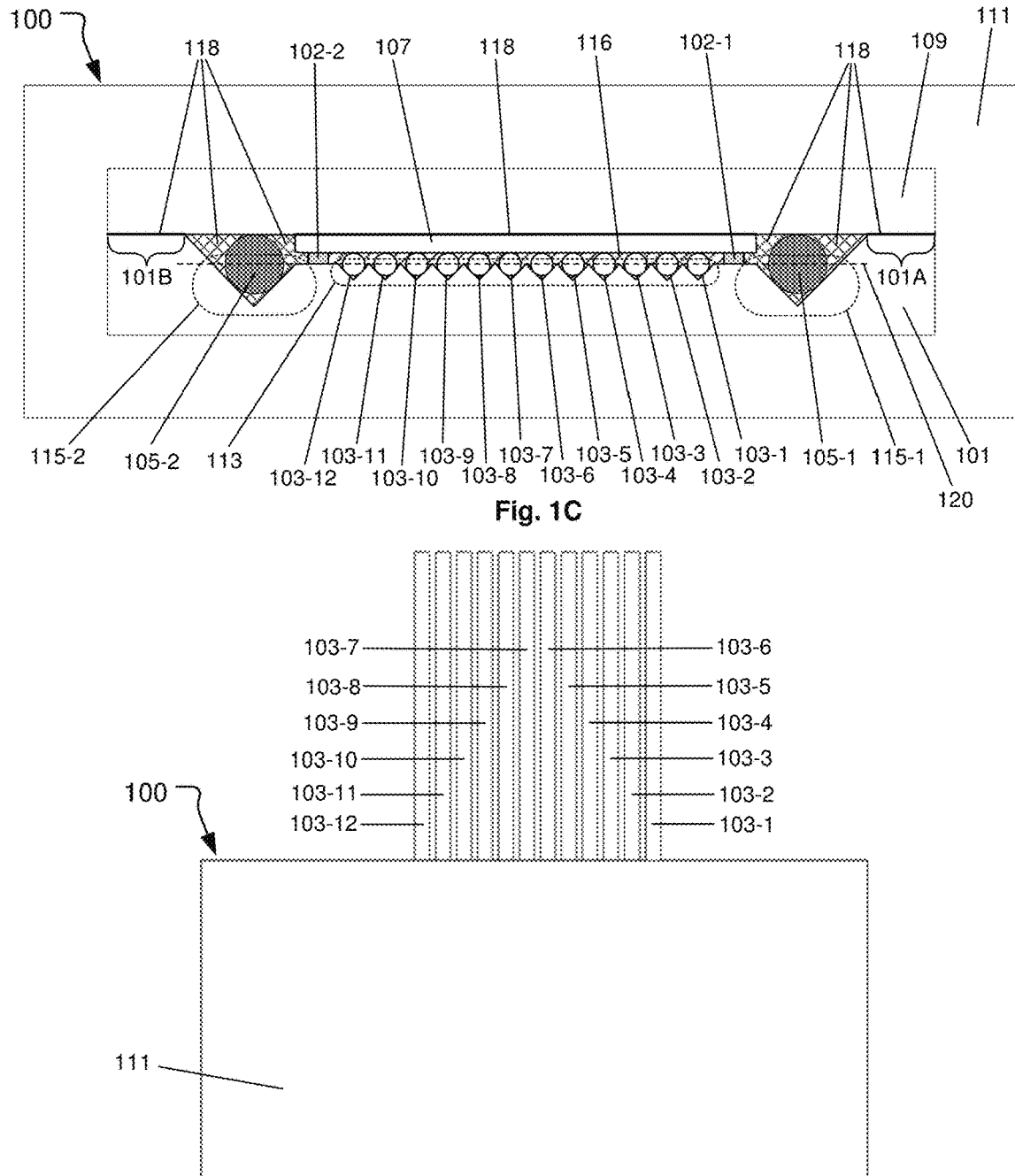
FIG. 1C shows a front view of the optical fiber connector of FIG. 1A, in accordance with some embodiments.
FIG. 1D shows a top view of the optical fiber connector of FIG. 1A, in accordance with some embodiments.

FIG. 1C shows a front view of the optical fiber connector 100 looking toward the optical connection end 112 of the optical fiber connector 100, in accordance with some embodiments. FIG. 1D shows a top view of the optical fiber connector 100, in accordance with some embodiments. The lower plate 101 includes a plurality of optical fiber alignment structures 113 extending from a first end 104 of the lower plate 101 (at the optical connection end 112 of the optical fiber connector 100) to a second end 106 of the lower plate 101 (next to the back end 114 of the optical fiber connector 100). In some embodiments, the plurality of optical fiber alignment structures 113 are formed as v-groove structures. In some embodiments, the plurality of optical fiber alignment structures 113 are formed as a channel structures, e.g., v-groove, rectangular, polygonal, etc., that are capable of receiving, positioning, and orienting respective ones of the plurality of optical fibers 103-1 to 103-12. The plurality of optical fibers 103-1 to 103-12 are respectively disposed in the plurality of optical fiber alignment structures 113 of the lower plate 101, such that an end of each of the plurality of optical fibers 103-1 to 103-12 is positioned at the first end 104 of the lower plate 101.

The lower plate 101 also includes a first guide element alignment structure 115-1 formed at a first side of the plurality of optical fiber alignment structures 113. The first guide element 105-1 is disposed in the first guide element alignment structure 115-1 of the lower plate 101. The first guide element 105-1 is positioned to extend outside of a periphery of the lower plate 101 at the first end 104 of the lower plate 101. The lower plate 101 also includes a second guide element alignment structure 115-2 formed at a second side of the plurality of optical fiber alignment structures 113. The second guide element 105-2 is disposed in the second guide element alignment structure 115-2 of the lower plate 101. The second guide element 105-2 is positioned to extend outside of the periphery of the lower plate 101 at the first end 104 of the lower plate 101. In some embodiments, the first guide element alignment structure 115-1 and the second guide element alignment structure 115-2 are formed as respective v-groove structures. In some embodiments, the first guide element alignment structure 115-1 and the second guide element alignment structure 115-2 are formed as respective channel structures, e.g., v-groove, rectangular, polygonal, etc., that are capable of receiving, positioning, and orienting the first guide element 105-1 and the second guide element 105-2, respectively.

In some embodiments, each of the plurality of optical fibers 103-1 to 103-12 has a first diameter, and each of the first guide element 105-2 and the second guide element 105-2 is a respective pin that has a second diameter larger that the first diameter of the plurality of optical fibers 103-1 to 103-12. Also, in the optical fiber connector 100, the second diameter of the first guide element 105-1 is substantially uniform along a full length of the first guide element 105-1, including both a portion of the first guide element 105-1 that sits within the first guide element alignment structure 115-1 and a portion of the first guide element 105-1 that extends outside of the periphery of the lower plate 101 at the first end 104 of the lower plate 101. Similarly, in the optical fiber connector 100, the second diameter of the second guide element 105-2 is substantially uniform along a full length of the second guide element 105-2, including both a portion of the second guide element 105-2 that sits within the second guide element alignment structure 115-2 and a portion of the second guide element 105-2 that extends outside of the periphery of the lower plate 101 at the first end 104 of the lower plate 101. In some embodiments, such as shown in FIG. 1C, each of the first guide element alignment structure 115-1 and the second guide element alignment structure 115-2 of the lower plate 101 is sized to provide a substantially coplanar alignment of axial centerlines of the first guide element 105-1 and the second guide element 105-2 with axial centerlines of the plurality of optical fibers 103-1 to 103-12, as indicated by dashed line 120.

The cover plate 107 is disposed over the plurality of optical fiber alignment structures 113. The cover plate 107 is positioned between the first guide element 105-1 and the second guide element 105-2. The cover plate 107 is secured to the lower plate 101 to hold the plurality of optical fibers 103-1 to 103-12 within the plurality of optical fiber alignment structures 113 of the lower plate 101. In some embodiments, a first adhesive 116 is disposed between the cover plate 107 and the lower plate 101, and over and between the plurality of optical fibers 103-1 to 103-12. In some embodiments, the first adhesive 116 is an epoxy material. However, in other embodiments, the first adhesive 116 can be essentially any type of adhesive that is chemically compatible with the materials of the lower plate 101, the plurality of optical fibers 103-1 to 103-12, and the cover plate 107, and that is thermally compatible with the high-temperature of the solder reflow process. In some embodiments, the first adhesive 116 is disposed to provide a substantially even pressure across the cover plate 107 when the cover plate 107 is pressed by the upper plate 109. In some embodiments, a disposed volume and location of the first adhesive 116 are controlled to ensure that the first adhesive 116 does not flow into the first guide element alignment structure 115-1 and the second guide element alignment structure 115-2. In some embodiments, an optional first dam structure 102-1 is formed across the top surface of the lower plate 101 between the first end 104 of the lower plate 101 and the second end 106 of the lower plate 101 at a location between the plurality of optical fiber alignment structures 113 and the first guide element alignment structure 115-1. Also, in some embodiments, an optional second dam structure 102-2 is formed across the top surface of the lower plate 101 between the first end 104 of the lower plate 101 and the second end 106 of the lower plate 101 at a location between the plurality of optical fiber alignment structures 113 and the second guide element alignment structure 115-2. The first dam structure 102-1 and the second dam structure 102-2 are configured to prevent the first adhesive 116 from flowing into the first guide element alignment structure 115-1 and the second guide element alignment structure 115-2, respectively. In some embodiments, the first dam structure 102-1 and the second dam structure 102-2 are formed as an integral part of the lower plate 101. In some embodiments, the first dam structure 102-1 and the second dam structure 102-2 are formed as separate structures that are attached to the lower plate 101, such as by way of fusion bonding or adhesive. In some embodiments, a thickness of the first adhesive 116 is within a range extending from greater than zero up to about 300 micrometers. In some embodiments, a thickness of the first adhesive 116 is within a range extending from greater than zero up to about 500 micrometers.

The upper plate 109 is disposed over each of the cover plate 107, the first guide element 105-1, and the second guide element 105-2. The upper plate 109 is secured to the lower plate 101 to hold the first guide element 105-1 within the first guide element alignment structure 115-1 of the lower plate 101, and to hold the second guide element 105-2 within the second guide element alignment structure 115-2 of the lower plate 101. In some embodiments, a second adhesive 118 is disposed between the upper plate 109 and each of the cover plate 107 and the lower plate 101. In some embodiments, the second adhesive 118 is an epoxy material. However, in other embodiments, the second adhesive 118 can be essentially any type of adhesive that is chemically compatible with the materials of the upper plate 109, the cover plate 107, the lower plate 101, the first guide element 105-1, and the second guide element 105-2, and that is thermally compatible with the high-temperature of the solder reflow process. In some embodiments, the second adhesive 118 is disposed to provide a substantially even pressure across the cover plate 107 when the cover plate 107 is pressed by the upper plate 109. In some embodiments, the second adhesive 118 is disposed to contact the first guide element 105-1 and the second guide element 105-2 within the first guide element alignment structure 115-1 and the second guide element alignment structure 115-2, respectively. In some embodiments, a thickness of the second adhesive 118 is within a range extending from greater than zero up to about 300 micrometers. In some embodiments, a thickness of the second adhesive 118 is within a range extending from greater than zero up to about 500 micrometers. In some embodiments, the second adhesive 118 is configured to soften during the solder reflow process to accommodate an amount of differential thermal expansion between the lower plate 101, the upper plate 109, the first guide element 105-1, and the second guide element 105-2.

In some embodiments, a substantially planar portion of the upper plate 109 extends over each of the cover plate 107, the first guide element 105-1, and the second guide element 105-2. In some embodiments, the upper plate 109 extends over the lower plate 101 at a first location 101A outside of the first guide element 105-1 relative to the cover plate 107. Also, in some embodiments, the upper plate 109 extends over the lower plate 101 at a second location 101B outside of the second guide element 105-2 relative to the cover plate 107. In some embodiments, the second adhesive 118 is disposed between the upper plate 109 and the lower plate 101 at each of the first location 101A and the second location 101B.

Figure 2A:
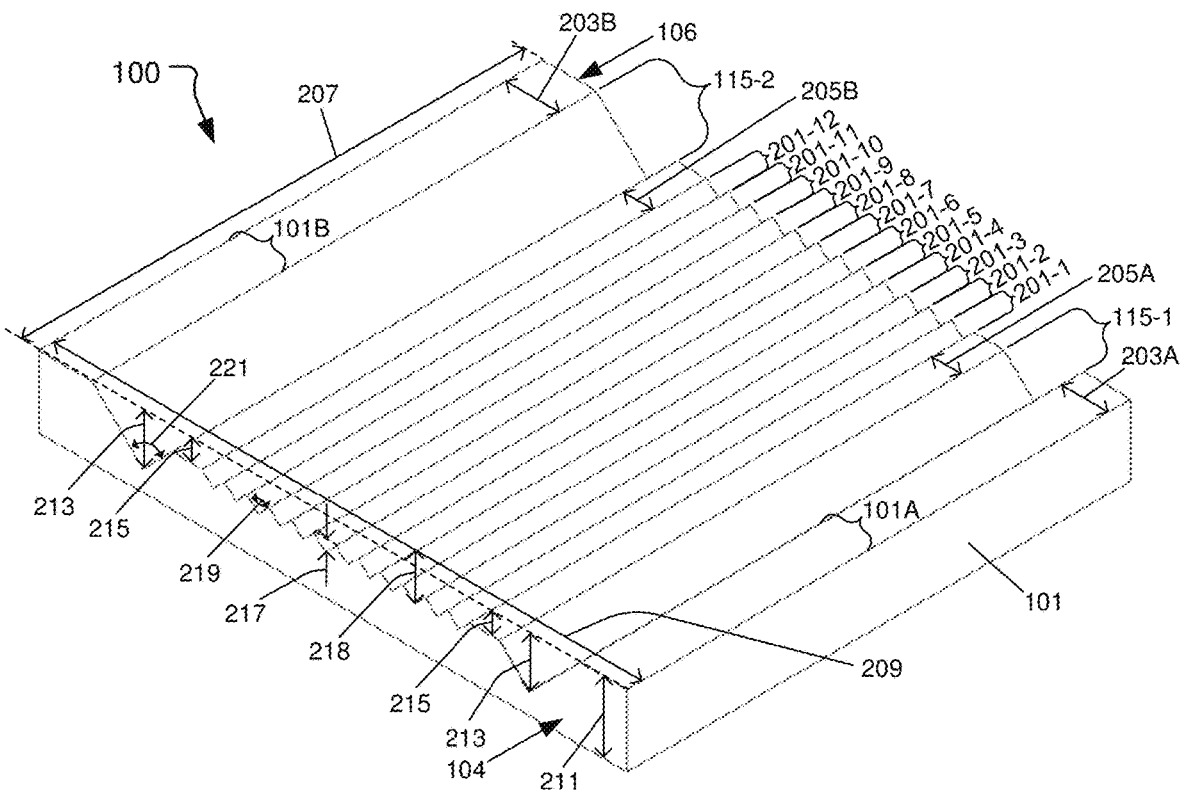
FIG. 2A shows a front-upper isometric view of the lower plate of the optical fiber connector of FIG. 1A, in accordance with some embodiments.
Figure 2B:
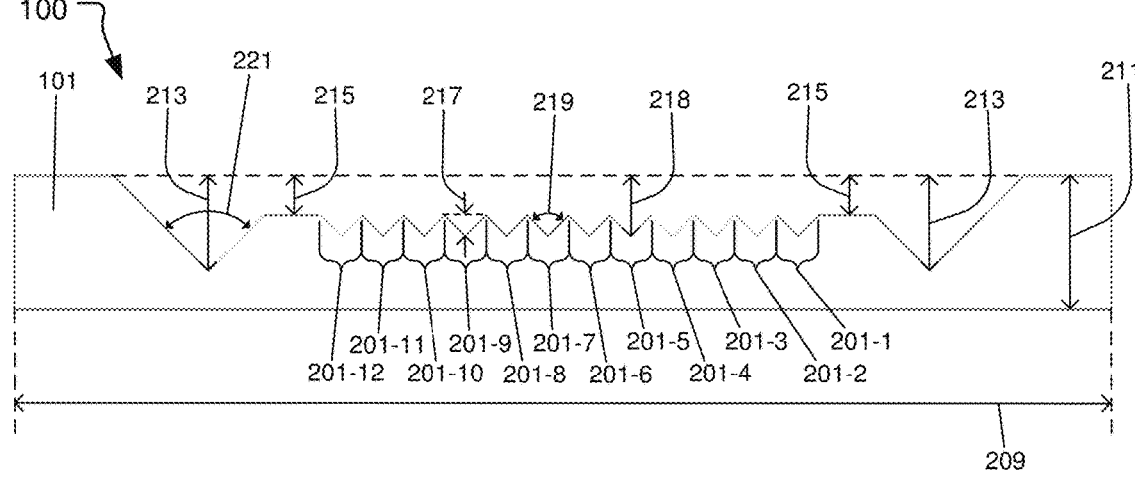
FIG. 2B shows a front view of the lower plate of the optical fiber connector of FIG. 1A, in accordance with some embodiments.
Figure 2C:
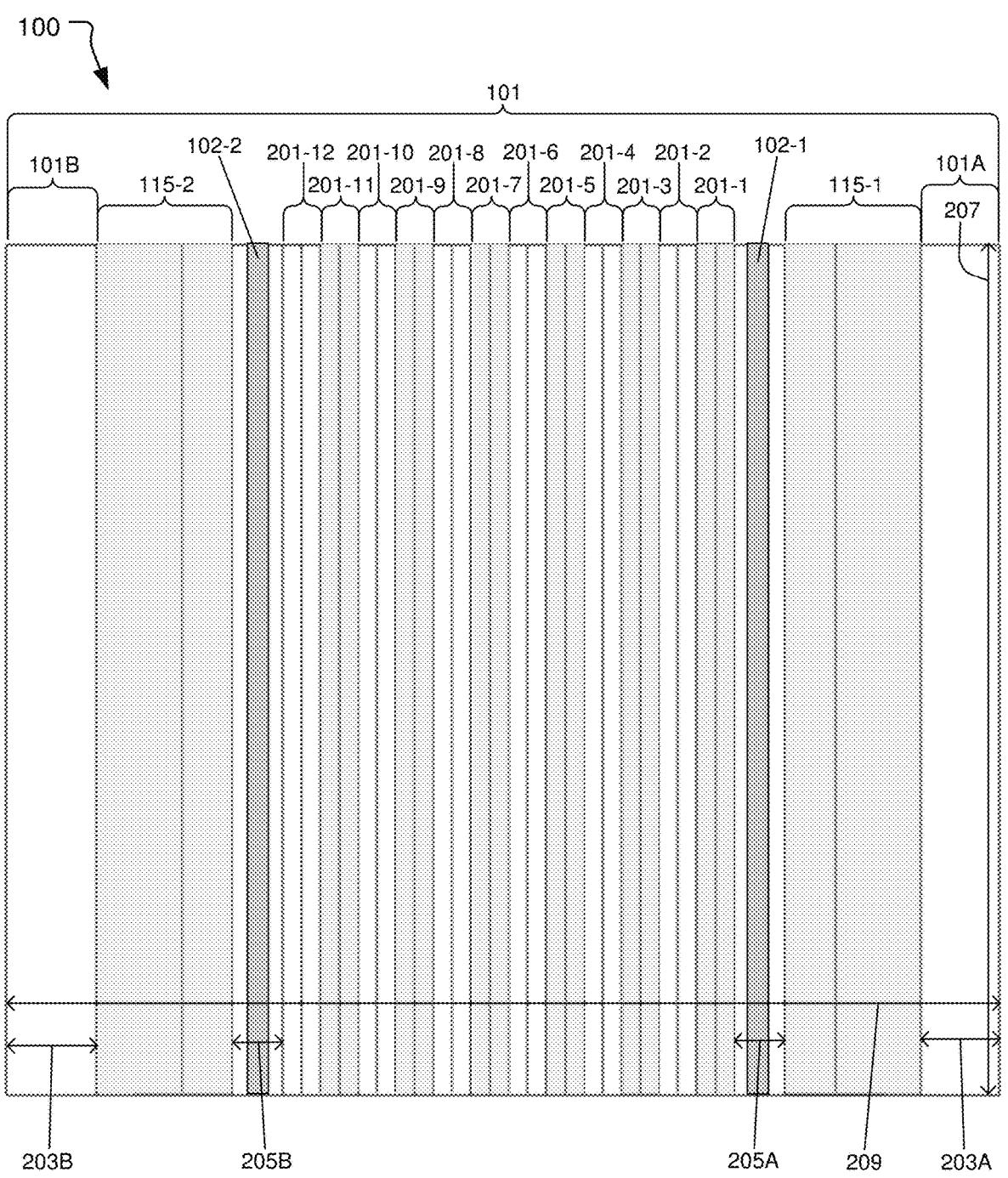
FIG. 2C shows a top view of the lower plate of the optical fiber connector of FIG. 1A, in accordance with some embodiments.

FIGS. 2A through 2L show a process for assembling the optical fiber connector 100, in accordance with some embodiments. FIG. 2A shows a front-upper isometric view of the lower plate 101 of the optical fiber connector 100, in accordance with some embodiments. FIG. 2B shows a front view of the lower plate 101 of the optical fiber connector 100, in accordance with some embodiments. FIG. 2C shows a top view of the lower plate 101 of the optical fiber connector 100, in accordance with some embodiments. In this example embodiment, the plurality of optical fiber alignment structures 113 is formed as a plurality of v-grooves 201-1 to 201-12, each of which extends in a linear direction from the first end 104 of the lower plate 101 (at the optical connection end 112 of the optical fiber connector 100) to the second end 106 of the lower plate 101 (near the back end 114 of the optical fiber connector 100). Also, the first guide element alignment structure 115-1 is formed as a v-groove, and the second guide element alignment structure 115-2 is formed as a v-groove. In some embodiments, each of the first guide element alignment structure 115-1 and the second guide element alignment structure 115-2 is formed to extend in a linear direction from the first end 104 of the lower plate 101 to the second end 106 of the lower plate 101. In some embodiments, the plurality of v-grooves 201-1 to 201-12 and the v-grooves of the first guide element alignment structure 115-1 and the second guide element alignment structure 115-2 are oriented to extend lengthwise in a parallel orientation with respect to each other.

In some embodiments, the lower plate 101 is formed of a material that is mechanically stable at a temperature greater than or equal to about 250° C. In some embodiments, the lower plate 101 is formed of glass. In some embodiments, the lower plate 101 is formed of metal. In some embodiments, the lower plate 101 is formed of ceramic. In some embodiments, the lower plate 101 has an overall vertical thickness, as indicated by arrow 211, greater than or equal to about 150 micrometers. In some embodiments, the v-grooves 201-1 to 201-12 for the plurality of optical fiber alignment structures 113, the v-groove for the first guide element alignment structure 115-1, and the v-groove for the second guide element alignment structure 115-2 are formed by one or more of machining, chemical etching, plasma etching, KOH (potassium hydroxide) etching, or by another formation process. In some embodiments, the v-grooves 201-1 to 201-12 for the plurality of optical fiber alignment structures 113, the v-groove for the first guide element alignment structure 115-1, and the v-groove for the second guide element alignment structure 115-2 are each formed to have a positional and dimensional accuracy within a range extending from about +/−0.5 micrometer to about +/−3 micrometers. In some embodiments, the v-grooves 201-1 to 201-12 for the plurality of optical fiber alignment structures 113, the v-groove for the first guide element alignment structure 115-1, and the v-groove for the second guide element alignment structure 115-2 are each formed to have a positional and dimensional accuracy of about +/−1 micrometer.

In some embodiments, each of the v-grooves 201-1 to 201-12 for the plurality of optical fiber alignment structures 113 has a vertical depth, as indicated by arrow 217, within a range extending from about 40 micrometers to about 125 micrometers. In some embodiments, each of the v-grooves 201-1 to 201-12 for the plurality of optical fiber alignment structures 113 has a bottom angle, as indicated by arrow 219, of greater than about 45°. In some embodiments, each of the v-grooves 201-1 to 201-12 for the plurality of optical fiber alignment structures 113 has a bottom angle, as indicated by arrow 219, of about 90°. In some embodiments, each of the v-grooves for the first guide element alignment structure 115-1 and the second guide element alignment structure 115-2 has a vertical depth, as indicated by arrow 213, within a range extending from about 100 micrometers to about 800 micrometers. In some embodiments, each of the v-grooves for the first guide element alignment structure 115-1 and the second guide element alignment structure 115-2 has a bottom angle, as indicated by arrow 221, of greater than about 45°. In some embodiments, each of the v-grooves for the first guide element alignment structure 115-1 and the second guide element alignment structure 115-2 has a bottom angle, as indicated by arrow 221, of about 90°. In some embodiments, each of the v-groove structures 201-1 to 201-12 of the plurality of optical fiber alignment structures 113 is configured to extend a first vertical depth, as indicated by arrow 218, into the lower plate 101, and each of the v-groove structures of the first guide element alignment structure 115-1 and the second guide element alignment structure 115-2 is configured to extend a second vertical depth, as indicated by the arrow 213, into the lower plate 101, where the second vertical depth is larger than the first vertical depth.

In some embodiments, the lower plate 101 is formed to have a width, as indicated by arrow 209, greater than about 1500 micrometers. In some embodiments, the lower plate 101 is formed to have a length, as indicated by arrow 207, greater than about 1000 micrometers. In some embodiments, the portion of the lower plate 101 between the plurality of optical fiber alignment structures 113 and the first guide element alignment structure 115-1 has a width, as indicated by arrow 205A, within a range extending from about 50 micrometers to about 300 micrometers. Similarly, in some embodiments, the portion of the lower plate 101 between the plurality of optical fiber alignment structures 113 and the second guide element alignment structure 115-2 also has a width, as indicated by arrow 205B, within a range extending from about 50 micrometers to about 300 micrometers. In some embodiments, the portion of the lower plate 101 between the plurality of optical fiber alignment structures 113 and the first guide element alignment structure 115-1 is formed at a vertical depth, as indicated by arrow 215, within a range extending from greater than zero to about 150 micrometers. Similarly, in some embodiments, the portion of the lower plate 101 between the plurality of optical fiber alignment structures 113 and the second guide element alignment structure 115-2 is formed at the same vertical depth as indicated by arrow 215. In some embodiments, the first location 101A of the lower plate 101 outside of the first guide element 105-1 relative to the cover plate 107 has as width, as indicated by arrow 203A, within a range extending from about 50 micrometers to about 1000 micrometers. Also, in some embodiments, the second location 101B of the lower plate 101 outside of the second guide element 105-2 relative to the cover plate 107 has as width, as indicated by arrow 203B, within a range extending from about 50 micrometers to about 1000 micrometers.

Figure 2D:
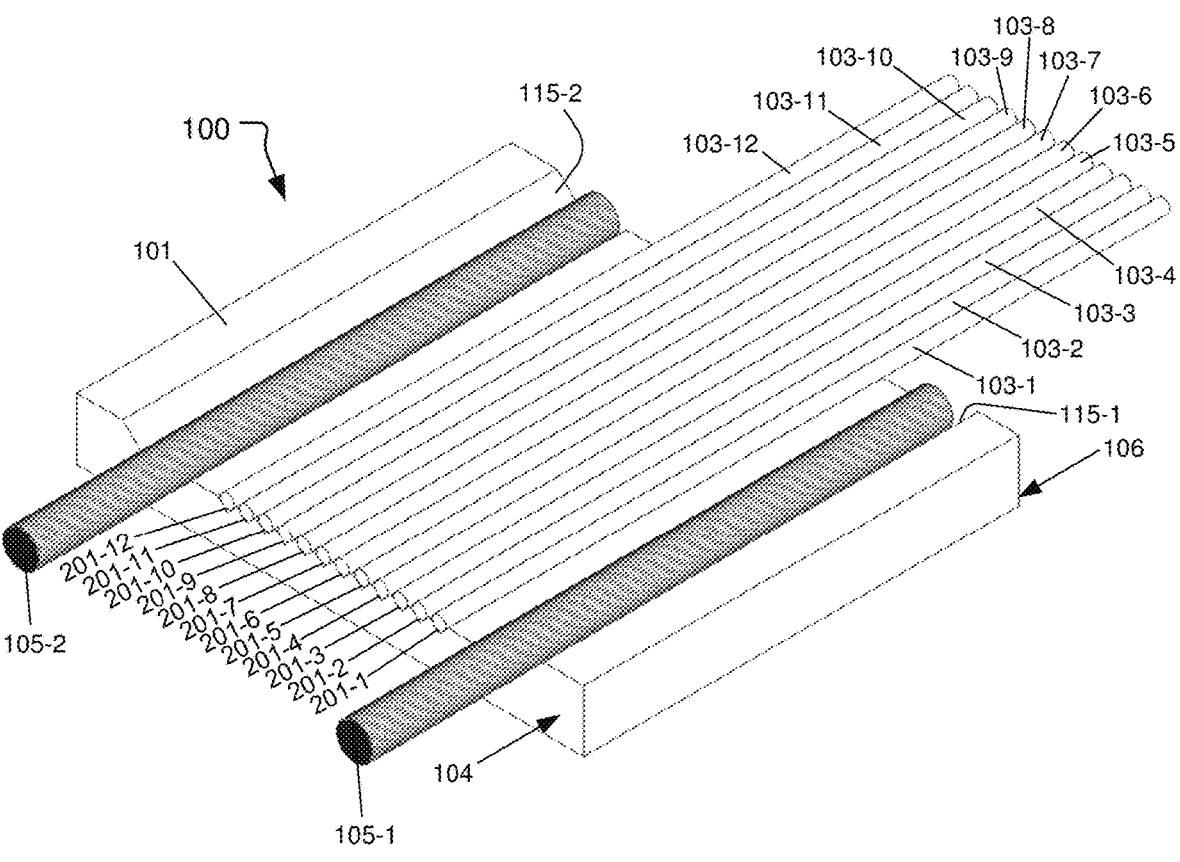
FIG. 2D shows a front-upper isometric view of the lower plate with the plurality of optical fibers respectively positioned within the plurality of v-grooves within the optical fiber connector of FIG. 1A, in accordance with some embodiments.
Figure 2E:
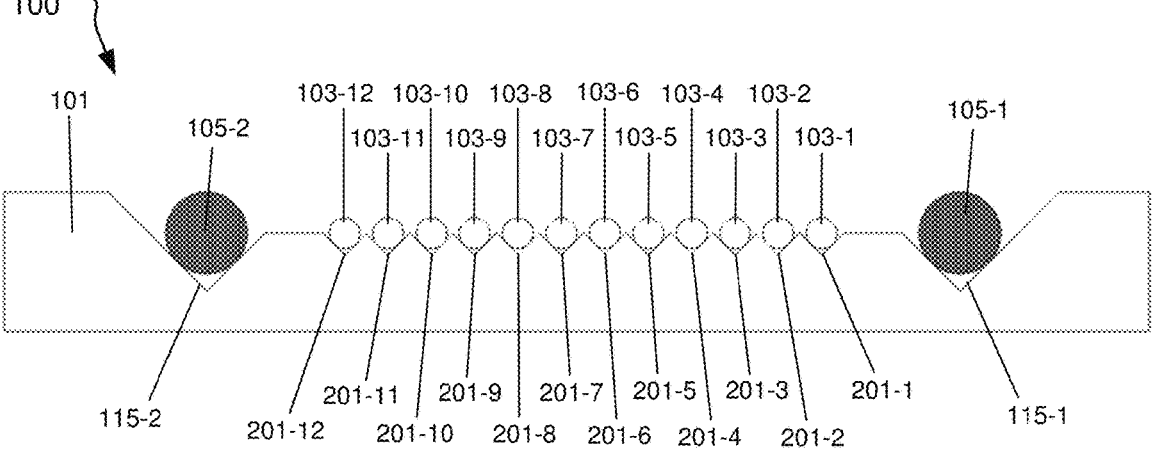
FIG. 2E shows a front view of the configuration of FIG. 2D, in accordance with some embodiments.
Figure 2F:
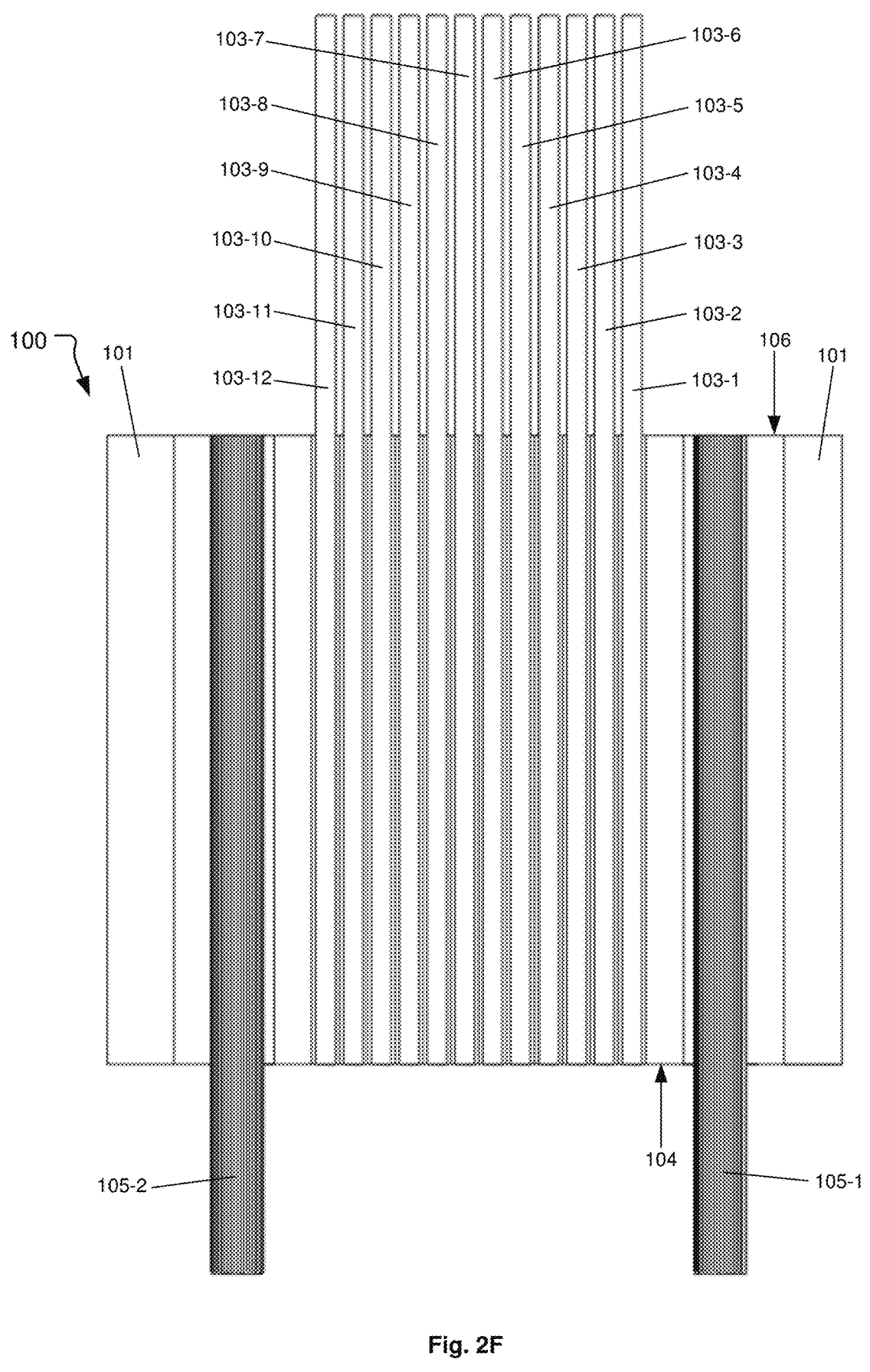

FIG. 2D shows a front-upper isometric view of the lower plate 101 with the plurality of optical fibers 103-1 to 103-12 respectively positioned within the plurality of v-grooves 201-1 to 201-12 within the optical fiber connector 100, in accordance with some embodiments. Each of the plurality of optical fibers 103-1 to 103-12 has an optical core exposed at the optical connection end 112 of the optical fiber connector 100 corresponding to the first end 104 of the lower plate 101. Each of the plurality of optical fibers 103-1 to 103-12 also extends out of the back end 114 of the optical fiber connector 100 opposite from the optical connection end 112 of the optical fiber connector 100. FIG. 2D also shows the first guide element 105-1 disposed within the v-groove that forms the first guide element alignment structure 115-1. FIG. 2D also shows the second guide element 105-2 disposed within the v-groove that forms the second guide element alignment structure 115-2. FIG. 2E shows a front view of the configuration of FIG. 2D, in accordance with some embodiments. FIG. 2F shows a top view of the configuration of FIG. 2D, in accordance with some embodiments.

In some embodiments, each of the first guide element 105-1 and the second guide element 105-2 is formed as a cylindrical shaped pin having a circular-shaped vertical cross-section. In some embodiments, each of the first guide element 105-1 and the second guide element 105-2 is formed to have a vertical cross-section shape that is either rectangular, triangular, polygonal, curved, or a combination thereof. It should be understood that the vertical cross-section shape of the first guide element 105-1 and the second guide element 105-2 is formed to match a corresponding receptacle within an optical connector to which the optical fiber connector 100 is to be connected. In this manner, when the first guide element 105-1 and the second guide element 105-2 are inserted into the corresponding receptacles within the optical connector to which the optical fiber connector 100 is connected, the plurality of optical fibers 103-1 to 103-12 will be appropriately aligned with respective optical devices within the optical connector to which the optical fiber connector 100 is connected. In some embodiments, the first guide element 105-1 and the second guide element 105-2 is formed as a cylindrical shaped pin having a diameter within a range extending from about 500 microm-eters to about 1000 micrometers. In some embodiments, the first guide element 105-1 and the second guide element 105-2 is formed as a cylindrical shaped pin having a diameter of about 700 micrometers. In some embodiments, each of the first guide element 105-1 and the second guide element 105-2 has a length that extends along a substantial entirety of the length of the corresponding first guide element alignment structure 115-1 and second guide element alignment structure 115-2, respectively, and that extends outside of the periphery of the lower plate 101 at the first end 104 of the lower plate 101. In other embodiments, each of the first guide element 105-1 and the second guide element 105-2 has a length that extends along less than the entire length of the corresponding first guide element alignment structure 115-1 and second guide element alignment struc-ture 115-2, respectively, while still extending outside of the periphery of the lower plate 101 at the first end 104 of the lower plate 101.

In some embodiments, each of the first guide element 105-1 and the second guide element 105-2 is formed of a material that is mechanically stable at a temperature greater than or equal to about 250° C. In some embodiments, each of the first guide element 105-1 and the second guide element 105-2 is formed of metal. In some embodiments, each of the first guide element 105-1 and the second guide element 105-2 is formed of glass. In some embodiments, each of the first guide element 105-1 and the second guide element 105-2 is formed of ceramic.

Figures 2G, 2H:
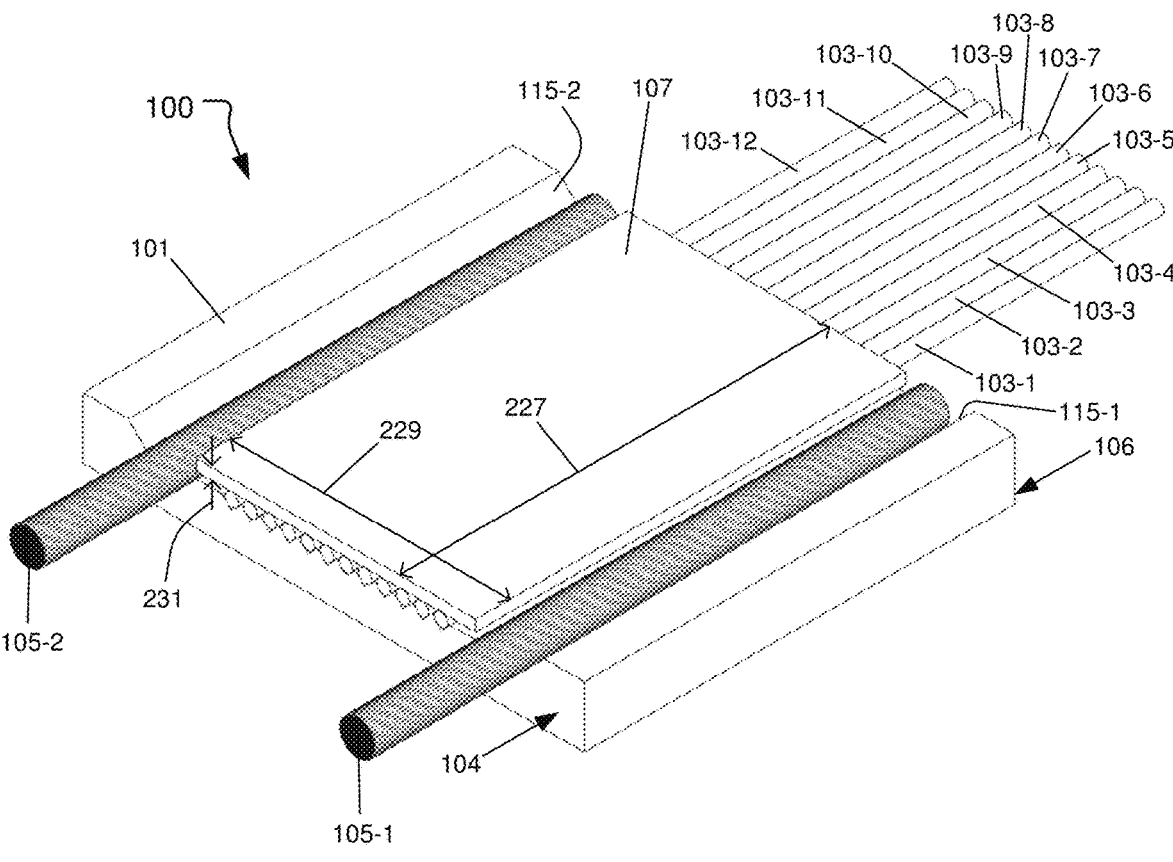
FIG. 2G shows the front-upper isometric view of the configuration of FIG. 2D with the cover plate disposed over the plurality of optical fibers, in accordance with some embodiments.
FIG. 2H shows a front view of the configuration of FIG. 2G, in accordance with some embodiments.
Figure 2I:
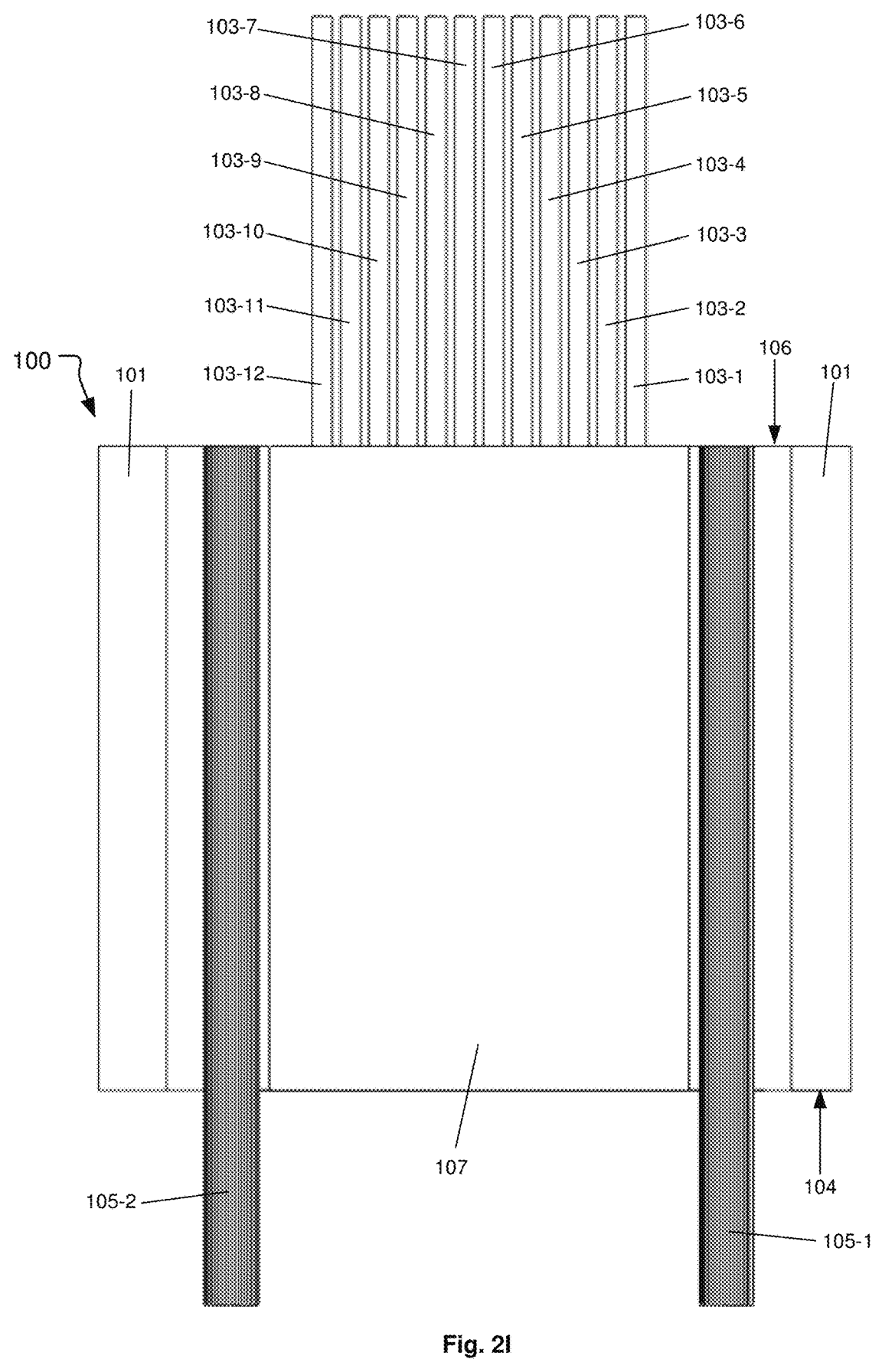

FIG. 2G shows the front-upper isometric view of the configuration of FIG. 2D with the cover plate 107 disposed over the plurality of optical fibers 103-1 to 103-12, in accordance with some embodiments. FIG. 2H shows a front view of the configuration of FIG. 2G, in accordance with some embodiments. FIG. 2I shows a top view of the configuration of FIG. 2G, in accordance with some embodi-ments. In some embodiments, the cover plate 107 has a bottom surface that is substantially flat and a top surface that is substantially flat. The bottom surface of the cover plate 107 is oriented to face toward the plurality of optical fibers 103-1 to 103-12 and toward the lower plate 101. In some embodiments, the cover plate 107 is disposed to have the bottom surface of the cover plate 107 physically contact the plurality of optical fibers 103-1 to 103-12. In some embodi-ments, the cover plate 107 is formed of a material that is mechanically stable at a temperature greater than or equal to about 250° C. In some embodiments, the cover plate 107 is formed of metal. In some embodiments, the cover plate 107 is formed of glass. In some embodiments, the cover plate 107 is formed of ceramic.

In some embodiments, the cover plate 107 has a width, as indicated by arrow 229, that is large enough to cover the plurality of optical fibers 301-1 to 301-12, and that is less than a distance between the first guide element 105-1 and the second guide element 105-2 as measured in the direction of the arrow 229. In some embodiments, the cover plate 107 has a length, as indicated by arrow 227, that is less than or equal to the length, as indicated by arrow 207, of the lower plate 101. In some embodiments, the length of the cover plate 107, as indicated by arrow 227, is substantially equal to the length of the lower plate 101, as indicated by arrow 207. In some embodiments, the cover plate 107 has a vertical thickness, as indicated by arrow 231, greater than or equal to about 50 micrometers. In some embodiments, the vertical thickness of the cover plate 107, as indicated by arrow 231, is within a range extending from about 150 micrometers to about 400 micrometers. In some embodiments, the vertical thickness of the cover plate 107, as indicated by arrow 231, is about 287 micrometers. In some embodiments, the adhe-sive 116 is disposed between the cover plate 107 and the lower plate 101, and between the cover plate 107 and the plurality of optical fibers 103-1 to 103-12. In some embodi-ments, as the cover plate 107 is pressed to physically contact the plurality of optical fibers 103-1 to 103-12, the adhesive 116 is pushed into the interstitial spaces between the plu-rality of optical fibers 103-1 to 103-12 and into the inter-stitial spaces between the lower plate 101 and the plurality of optical fibers 103-1 to 103-12.

Figure 2J:
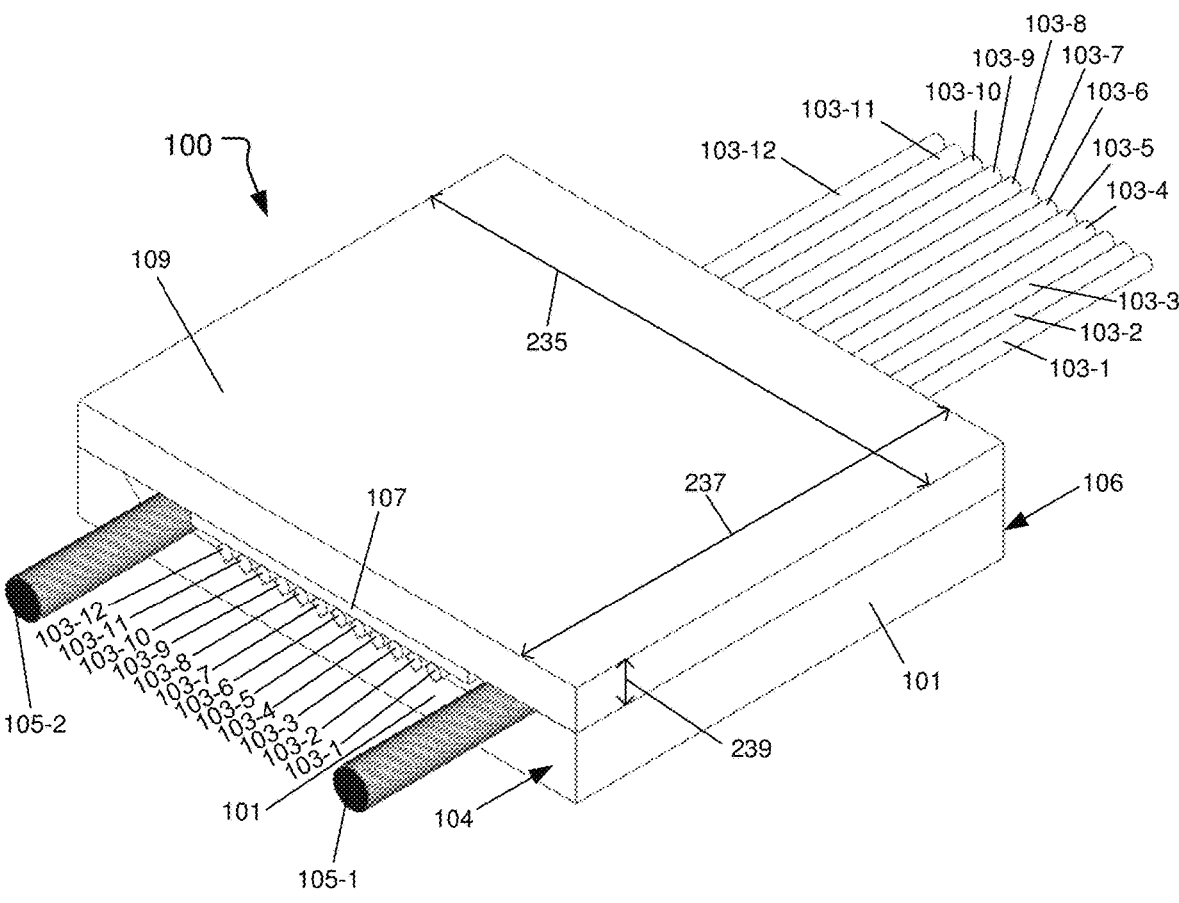
FIG. 2J shows the front-upper isometric view of the configuration of FIG. 2G with the upper plate disposed over each of the cover plate, the first guide element, the second guide element, and the lower plate, in accordance with some embodiments.
Figure 2K:
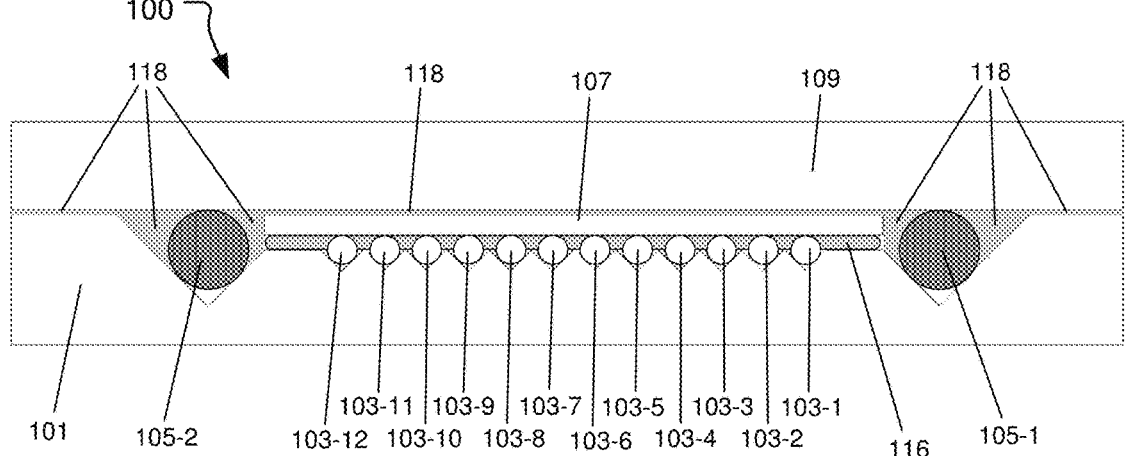
FIG. 2K shows a front view of the configuration of FIG. 2J, in accordance with some embodiments.
Figure 2L:
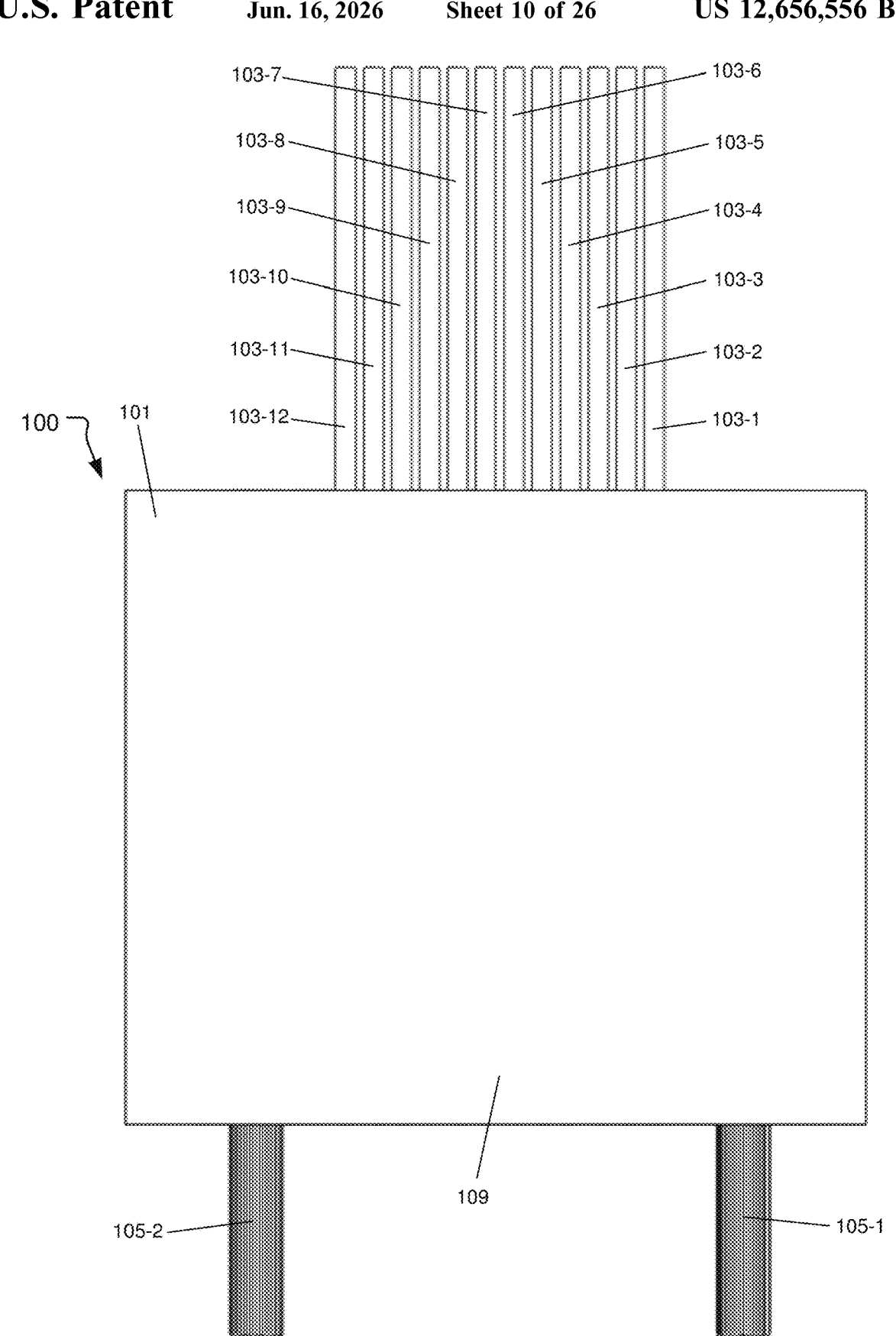
FIG. 2L shows a top view of the configuration of FIG. 2J, in accordance with some embodiments.

FIG. 2J shows the front-upper isometric view of the configuration of FIG. 2G with the upper plate 109 disposed over each of the cover plate 107, the first guide element 105-1, the second guide element 105-2, and the lower plate 101, in accordance with some embodiments. FIG. 2K shows a front view of the configuration of FIG. 2J, in accordance with some embodiments. FIG. 2L shows a top view of the configuration of FIG. 2J, in accordance with some embodi-ments. In some embodiments, the upper plate 109 has a bottom surface that is substantially flat and a top surface that is substantially flat, with the bottom surface of the upper plate 109 oriented to face toward the cover plate 107. In some embodiments, the upper plate 109 is disposed to have the bottom surface of the upper plate 109 physically contact the top surface of the cover plate 107. Also, in some embodiments, the upper plate 109 is disposed to have the bottom surface of the upper plate 109 physically contact each of the first guide element 105-1 and the second guide element 105-2. In some embodiments, the upper plate 109 is formed of a material that is mechanically stable at a tem-perature greater than or equal to about 250° C. In some embodiments, the upper plate 109 is formed of metal. In some embodiments, the upper plate 109 is formed of glass. In some embodiments, the upper plate 109 is formed of ceramic.

In some embodiments, the upper plate 109 has a width, as indicated by arrow 235, that is substantially equal to the width, as indicated by arrow 209, of the lower plate 101. In some embodiments, the upper plate 109 has a length, as indicated by arrow 237, that is substantially equal to the length, as indicated by arrow 207, of the lower plate 101. In some embodiments, the upper plate 109 has a vertical thickness, as indicated by arrow 239, greater than or equal to about 50 micrometers. In some embodiments, the vertical thickness of the upper plate 109, as indicated by arrow 239, is within a range extending from about 150 micrometers to about 1000 micrometers. In some embodiments, the vertical thickness of the upper plate 109, as indicated by arrow 239, is greater than the vertical thickness of the cover plate 107, as indicated by arrow 231. In some embodiments, the adhesive 118 is disposed between the upper plate 109 and the cover plate 107, and between the upper plate 109 and the lower plate 101, and between the upper plate 109 and each of the first guide element 105-1 and the second guide element 105-2. In some embodiments, the upper plate 109 is pressed against each of the cover plate 107, the first guide element 105-1, and the second guide element 105-2, so as to hold the plurality of optical fibers 103-1 to 103-12 in place against the lower plate 101 by way of the cover plate 107, and so as to hold the first guide element 105-1 and the second guide element 105-2 in place against the lower plate 101.

In some embodiments, the vertical thickness of the cover plate 107, as indicated by arrow 231, is set so that the upper plate 109 just physically contacts the cover plate 107 when the upper plate 109 physically contacts each of the first guide element 105-1 and the second guide element 105-2. In some embodiments, the upper plate 109 is disposed to physically contact the cover plate 107. However, in some embodiments, a layer of the second adhesive 118 is disposed between the upper plate 109 and the cover plate 107, such that the upper plate 109 is physically separated from the cover plate 107 by the layer of the second adhesive 118. In these embodiments, a holding force is applied by the upper plate 109 to the cover plate 107, and in turn to the plurality of optical fibers 103-1 to 103-12, through the layer of the second adhesive 118. Also, in some embodiments, the upper plate 109 is disposed to physically contact the lower plate 101 at the first location 101A on the lower plate 101 outside of the first guide element 105-1 relative to the cover plate 107. Also, in these embodiments, the upper plate 109 is disposed to physically contact the lower plate 101 at the second location 101B on the lower plate 101 outside of the second guide element 105-2 relative to the cover plate 107. However, in some embodiments, a layer of the second adhesive 118 is disposed between the upper plate 109 and the lower plate 101 at each of the first location 101A and the second location 101B, such that the upper plate 109 is physically separated from the lower plate 101 by the second adhesive 118.

After the upper plate 109 is secured to the cover plate 107 and to the lower plate 101, the outer sheath 111 is formed around an outside of the upper plate 109 and around an outside of the lower plate 101, while leaving the plurality of optical fibers 103-1 to 103-12 uncovered at the optical connection end 112 of the optical fiber connector 100, as shown in FIG. 1A. In some embodiments, the outer sheath 111 is formed of a material that enhances the mechanical and structural strength to the optical fiber connector 100 and that provides for impact resilience of the optical fiber connector 100, such as from external forces. In some embodiments, the outer sheath 111 is formed to have an outer shape and size (form-factor) that is expected of a standard MT ferrule, such that optical fiber connector 100 can be implemented within existing optical fiber systems. In some embodiments, the outer sheath 111 is formed of metal. In some embodiments, the outer sheath 111 is formed of a plastic material that can withstand the high-temperature of the solder reflow process without substantive deformation.

It should be understood that the materials and configuration of the optical fiber connector 100 are able to withstand solder reflow temperatures in excess of 250° C., without deformation that would lead to increased optical insertion loss through the optical fiber connector 100. Therefore, the optical fiber connector 100 can be attached to an electro-optic chip and/or package before the electro-optic chip and/or package is subjected to a solder reflow process, such as for ball grid array (BGA) reflow in a flip-chip attachment process, among other high-temperature chip fabrication and/or packaging processes.

FIGS. 3A through 3K show a process for assembling an optical fiber connector 300 that includes the first plurality of optical fibers 103-1 to 103-12 and a second plurality of optical fibers 311-1 to 311-12, in accordance with some embodiments. The optical fiber connector 300 is a modification of the optical fiber connector 100. The process of FIGS. 3A through 3K proceeds after completion of a partial process for assembling the optical fiber connector 100 as depicted in FIGS. 2A through 2F. Specifically, the lower plate 101 of the optical fiber connector 100 is the same in the optical fiber connector 300. Also, the first guide element 105-1 and the second guide element 105-2 of the optical fiber connector 100 are the same in the optical fiber connector 300. Also, the plurality of optical fibers 103-1 to 103-12 in the optical fiber connector 100 are a first plurality of optical fibers 103-1 to 103-12 in the optical fiber connector 300. FIG. 3A shows the front-upper isometric view of the configuration of FIG. 2A with a cover plate 301 disposed over the plurality of optical fibers 103-1 to 103-12, in accordance with some embodiments. FIG. 3B shows a front view of the configuration of FIG. 3A, in accordance with some embodiments. FIG. 3C shows a top view of the configuration of FIG. 3A, in accordance with some embodiments.

In some embodiments, the cover plate 301 has a bottom surface that is substantially flat and a top surface that includes a second plurality of optical fiber alignment structures 309-1 to 309-12. The flat bottom surface of the cover plate 301 is oriented to face toward the first plurality of optical fibers 103-1 to 103-12 that are disposed in the first plurality of optical fiber alignment structures 201-1 to 201-12 that are formed in the lower plate 101. In some embodiments, the cover plate 301 is disposed to have the bottom surface of the cover plate 301 physically contact the first plurality of optical fibers 103-1 to 103-12. In some embodiments, the cover plate 301 is formed of a material that is mechanically stable at a temperature greater than or equal to about 250° C. In some embodiments, the cover plate 301 is formed of metal. In some embodiments, the cover plate 301 is formed of glass. In some embodiments, the cover plate 301 is formed of ceramic.

In some embodiments, the cover plate 301 has a width, as indicated by arrow 305, that is large enough to cover the first plurality of optical fibers 103-1 to 103-12, and that is less than a distance between the first guide element 105-1 and the second guide element 105-2 as measured in the direction of the arrow 305. In some embodiments, the cover plate 301 has a length, as indicated by arrow 303, that is less than or equal to the length, as indicated by arrow 207, of the lower plate 101. In some embodiments, the length of the cover plate 301, as indicated by arrow 303, is substantially equal to the length of the lower plate 101, as indicated by arrow 207. In some embodiments, the cover plate 301 has a vertical thickness, as indicated by arrow 307, greater than or equal to about 50 micrometers. In some embodiments, the vertical thickness of the cover plate 301, as indicated by arrow 307, is within a range extending from about 50 micrometers to about 400 micrometers. In some embodiments, the adhesive 116 is disposed between the cover plate 301 and the lower plate 101, and between the cover plate 301 and the first plurality of optical fibers 103-1 to 103-12. In some embodiments, as the cover plate 301 is pressed to physically contact the first plurality of optical fibers 103-1 to 103-12, the adhesive 116 is pushed into the interstitial spaces between the first plurality of optical fibers 103-1 to 103-12 and into the interstitial spaces between the lower plate 101 and the first plurality of optical fibers 103-1 to 103-12.

In some embodiments, the second plurality of optical fiber alignment structures 309-1 to 309-12 are formed as v-grooves within the top of the cover plate 301, each of which extends in a linear direction from a first end 302 of the cover plate 301 (at the optical connection end 112 of the optical fiber connector 300) to a second end 304 of the cover plate 301 (near the back end 114 of the optical fiber connector 300). In some embodiments, the v-grooves of the second plurality of optical fiber alignment structures 309-1 to 309-12 are oriented to extend lengthwise in a parallel orientation with respect to each other and with respect to the v-grooves 201-1 to 201-12 within the lower plate 101. In some embodiments, the cover plate 301 is configured and positioned such that the v-grooves of the second plurality of optical fiber alignment structures 309-1 to 309-12 are respectively vertically aligned with the v-grooves 201-1 to 201-12 within the lower plate 101. In some embodiments, the v-grooves of the second plurality of optical fiber alignment structures 309-1 to 309-12 are formed within the cover plate 301 by one or more of machining, chemical etching, plasma etching, KOH etching, or by another formation process. In some embodiments, each of the v-grooves of the second plurality of optical fiber alignment structures 309-1 to 309-12 is formed to have a positional and dimensional accuracy within a range extending from about +/−0.5 micrometer to about +/−3 micrometers. In some embodiments, each of the v-grooves of the second plurality of optical fiber alignment structures 309-1 to 309-12 is formed to have a positional and dimensional accuracy of about +/−1 micrometer. In some embodiments, each of the v-grooves of the second plurality of optical fiber alignment structures 309-1 to 309-12 has a vertical depth, as indicated by arrow 308, within a range extending from about 40 micrometers to about 125 micrometers. In some embodiments, each of the v-grooves of the second plurality of optical fiber alignment structures 309-1 to 309-12 has a bottom angle, as indicated by arrow 310, of greater than about 45°. In some embodiments, the bottom angle, as indicated by arrow 310, of each of the v-grooves of the second plurality of optical fiber alignment structures 309-1 to 309-12 is about 90°.

FIG. 3D shows the configuration of FIG. 3A with the second plurality of optical fibers 311-1 to 311-12 respectively positioned within the v-grooves of the second plurality of optical fiber alignment structures 309-1 to 309-12 within the cover plate 301, in accordance with some embodiments. Each of the second plurality of optical fibers 311-1 to

311-12 has an optical core exposed at the optical connection end 112 of the optical fiber connector 300 corresponding to the first end 302 of the cover plate 301. Also, each of the plurality of optical fibers 311-1 to 311-12 extends out of the back end 114 of the optical fiber connector 300 opposite from the optical connection end 112 of the optical fiber connector 300. FIG. 3D also shows the first guide element 105-1 disposed within the v-groove that forms the first guide element alignment structure 115-1. FIG. 3D also shows the second guide element 105-2 disposed within the v-groove that forms the second guide element alignment structure 115-2. FIG. 3E shows a front view of the configuration of FIG. 3D, in accordance with some embodiments. FIG. 3F shows a top view of the configuration of FIG. 3D, in accordance with some embodiments.

FIG. 3G shows the front-upper isometric view of the configuration of FIG. 3D with an upper plate 313 disposed over each of the cover plate 301, the second plurality of optical fibers 311-1 to 311-12, the first guide element 105-1, the second guide element 105-2, and the lower plate 101, in accordance with some embodiments. FIG. 3H shows a front view of the configuration of FIG. 3G, in accordance with some embodiments. In some embodiments, the upper plate 313 is configured and disposed over the cover plate 301 and over the second plurality of optical fibers 311-1 to 311-12 so as to hold the second plurality of optical fibers 311-1 to 311-12 within the second plurality of optical fiber alignment structures 309-1 to 309-12 of the cover plate 301. In some embodiments, the upper plate 313 has a bottom surface that includes a recessed region 313A configured to receive at least a portion of a vertical cross-section of the second plurality of optical fibers 311-1 to 311-12. In some embodiments, the recessed region 313A of the bottom surface of the upper plate 313 is also configured to receive at least a portion of a vertical cross-section of the cover plate 301. In some embodiments, the upper plate 313 is configured and disposed to have a first outer bottom surface portion of the upper plate 313 physically contact the first guide element 105-1. Also, in these embodiments, the upper plate 313 is configured and disposed to have a second outer bottom surface portion of the upper plate 313 physically contact the second guide element 105-2. In some embodiments, the upper plate 313 is formed of a material that is mechanically stable at a temperature greater than or equal to about 250° C. In some embodiments, the upper plate 313 is formed of metal. In some embodiments, the upper plate 313 is formed of glass. In some embodiments, the upper plate 313 is formed of ceramic.

In some embodiments, the upper plate 313 has a width, as indicated by arrow 312, that is substantially equal to the width, as indicated by arrow 209, of the lower plate 101. In some embodiments, the upper plate 313 has a length, as indicated by arrow 314, that is substantially equal to the length, as indicated by arrow 207, of the lower plate 101. In some embodiments, the upper plate 313 has a vertical thickness, as indicated by arrow 316, greater than or equal to about 50 micrometers. In some embodiments, the vertical thickness of the upper plate 313, as indicated by arrow 316, is within a range extending from about 150 micrometers to about 1000 micrometers. In some embodiments, an adhesive 315 is disposed between the upper plate 313 and the cover plate 301, and between the upper plate 313 and the second plurality of optical fibers 311-1 to 311-12. Also, in some embodiments, the adhesive 118 is disposed between the upper plate 313 and the lower plate 101, and between the upper plate 313 and each of the first guide element 105-1 and the second guide element 105-2. In some embodiments, the upper plate 313 is pressed against the cover plate 301 and each of the first guide element 105-1 and the second guide element 105-2, so as to hold the first plurality of optical fibers 103-1 to 103-12 in place against the lower plate 101 by way of the cover plate 301, and so as to hold the second plurality of optical fibers 311-1 to 311-12 in place against the cover plate 301, and so as to hold the first guide element 105-1 and the second guide element 105-2 in place against the lower plate 101.

In some embodiments, the recessed region 313A of the upper plate 313 physically contacts the second plurality of optical fibers 311-1 to 311-12 when the upper plate 313 physically contacts each of the first guide element 105-1 and the second guide element 105-2. In some embodiments, the upper plate 313 is disposed to physically contact the lower plate 101 at the first location 101A on the lower plate 101 outside of the first guide element 105-1 relative to the cover plate 301. Also, in these embodiments, the upper plate 313 is disposed to physically contact the lower plate 101 at the second location 101B on the lower plate 101 outside of the second guide element 105-2 relative to the cover plate 301. However, in some embodiments, a layer of the second adhesive 118 is disposed between the upper plate 313 and the lower plate 101 at each of the first location 101A and the second location 101B, such that the upper plate 313 is physically separated from the lower plate 101 by the second adhesive 118.

FIG. 3I shows a front-upper isometric view of the optical fiber connector 300, in accordance with some embodiments. FIG. 3J shows a front view of the optical fiber connector 300, in accordance with some embodiments. FIG. 3K shows a back-upper perspective view of the optical fiber connector 300, in accordance with some embodiments. After the upper plate 313 is secured to the cover plate 301 and to the lower plate 101, the outer sheath 111 is formed around an outside of the upper plate 313 and around an outside of the lower plate 101, while leaving the first plurality of optical fibers 103-1 to 103-12 and the second plurality of optical fibers 311-1 to 311-12 uncovered at the optical connection end 112 of the optical fiber connector 300. In some embodiments, the outer sheath 111 is formed of a material that enhances the mechanical and structural strength of the optical fiber connector 300 and that provides for impact resilience of the optical fiber connector 300, such as from external forces. In some embodiments, the outer sheath 111 is formed to have an outer shape and size that is expected of a standard MT ferrule, such that optical fiber connector 300 can be implemented within existing optical fiber systems.

It should be understood that the materials and configuration of the optical fiber connector 300 are able to withstand solder reflow temperatures in excess of 250° C., without deformation that would lead to increased optical insertion loss through the optical fiber connector 300. Therefore, the optical fiber connector 300 can be attached to an electro-optic chip and/or package before the electro-optic chip and/or package is subjected to a solder reflow process, such as for ball grid array (BGA) reflow in a flip-chip attachment process, among other high-temperature chip fabrication and/or packaging processes. Also, the optical fiber connector 300 includes a total of 24 optical fibers 103-1 to 103-12 and 311-1 to 311-12, to provide for a 24 channel optical fiber connection. However, it should be understood that in other embodiments, the optical fiber connector 300 can be configured to include either less than or more than 24 optical fibers.

FIGS. 4A through 4M show a process for assembling an optical fiber connector 400, in accordance with some embodiments. FIG. 4A shows a front-upper isometric view of a lower plate 401 of the optical fiber connector 400, in accordance with some embodiments. FIG. 4B shows a front view of the lower plate 401 of the optical fiber connector 400, in accordance with some embodiments. FIG. 4C shows a top view of the lower plate 401 of the optical fiber connector 400, in accordance with some embodiments. The lower plate 401 includes a plurality of optical fiber alignment structures 403-1 to 403-12 extending from a first end 412 of the lower plate 401 to a second end 414 of the lower plate 401. In some embodiments, the plurality of optical fiber alignment structures 403-1 to 403-12 are formed as v-groove structures. However, in some embodiments, the plurality of optical fiber alignment structures 403-1 to 403-12 are formed as a channel structures, e.g., v-groove, rectangular, polygonal, etc., that are capable of receiving, positioning, and orienting respective ones of the plurality of optical fibers 103-1 to 103-12. The plurality of optical fibers 103-1 to 103-12 are respectively disposed in the plurality of optical fiber alignment structures 403-1 to 403-12 of the lower plate 401, such that an end of each of the plurality of optical fibers 103-1 to 103-12 is positioned at the first end 412 of the lower plate 401.

The lower plate 401 also includes a first guide element alignment structure 405-1 formed at a first side of the plurality of optical fiber alignment structures 403-1 to 403-12. The lower plate 401 also includes a second guide element alignment structure 405-2 formed at a second side of the plurality of optical fiber alignment structures 403-1 to 403-12. In some embodiments, each of the first guide element alignment structure 405-1 and the second guide element alignment structure 405-2 is formed to have a substantially same configuration as each of the plurality of optical fiber alignment structures 403-1 to 403-12. In various embodiments, the first guide element alignment structure 405-1 and the second guide element alignment structure 405-2 are formed as respective channel structures, e.g., v-groove, rectangular, polygonal, etc., so as to substantially match the configuration of each of the plurality of optical fiber alignment structures 403-1 to 403-12. Each of the first guide element alignment structure 405-1 and the second guide element alignment structure 405-2 extends in a linear direction from the first end 412 of the lower plate 401 to the second end 414 of the lower plate 401. In some embodiments, the plurality of optical fiber alignment structures 403-1 to 403-12, first guide element alignment structure 405-1, and the second guide element alignment structure 405-2 are oriented to extend lengthwise in a parallel orientation with respect to each other.

In some embodiments, the lower plate 401 is formed of a material that is mechanically stable at a temperature greater than or equal to about 250° C. In some embodiments, the lower plate 401 is formed of glass. In some embodiments, the lower plate 401 is formed of metal. In some embodiments, the lower plate 401 is formed of ceramic. In some embodiments, the lower plate 401 has an overall vertical thickness, as indicated by arrow 411, greater than or equal to about 150 micrometers. In some embodiments, the v-grooves that form the plurality of optical fiber alignment structures 403-1 to 403-12, the v-groove that forms the first guide element alignment structure 405-1, and the v-groove that forms the second guide element alignment structure 405-2 are formed by one or more of machining, chemical etching, plasma etching, KOH etching, or by another formation process. In some embodiments, the v-grooves that form the plurality of optical fiber alignment structures 403-1 to 403-12, the v-groove that forms the first guide element alignment structure 405-1, and the v-groove that forms the second guide element alignment structure 405-2 are each formed to have a positional and dimensional accuracy within a range extending from about +/−0.5 micrometer to about +/−3 micrometers. In some embodiments, the v-grooves that form the plurality of optical fiber alignment structures 403-1 to 403-12, the v-groove that forms the first guide element alignment structure 405-1, and the v-groove that forms the second guide element alignment structure 405-2 are each formed to have a positional and dimensional accuracy of about +/−1 micrometer.

In some embodiments, the v-grooves that form the plurality of optical fiber alignment structures 403-1 to 403-12, the v-groove that forms the first guide element alignment structure 405-1, and the v-groove that forms the second guide element alignment structure 405-2 each has a vertical depth, as indicated by arrow 417, within a range extending from about 40 micrometers to about 125 micrometers. In some embodiments, the v-grooves that form the plurality of optical fiber alignment structures 403-1 to 403-12, the v-groove that forms the first guide element alignment structure 405-1, and the v-groove that forms the second guide element alignment structure 405-2 each has a bottom angle, as indicated by arrow 419, of greater than about 45°. In some embodiments, the v-grooves that form the plurality of optical fiber alignment structures 403-1 to 403-12, the v-groove that forms the first guide element alignment structure 405-1, and the v-groove that forms the second guide element alignment structure 405-2 each has a bottom angle, as indicated by arrow 419, of about 90°.

In some embodiments, the lower plate 401 is formed to have a width, as indicated by arrow 409, greater than about 1500 micrometers. In some embodiments, the lower plate 401 is formed to have a length, as indicated by arrow 407, greater than about 1000 micrometers. In some embodiments, the portion of the lower plate 401 between the plurality of optical fiber alignment structures 403-1 to 403-12 and the first guide element alignment structure 405-1 has a width, as indicated by arrow 423, within a range extending from about 50 micrometers to about 300 micrometers. Similarly, in some embodiments, the portion of the lower plate 401 between the plurality of optical fiber alignment structures 403-1 to 403-12 and the second guide element alignment structure 405-2 also has a width, as indicated by arrow 424, within a range extending from about 50 micrometers to about 300 micrometers. In some embodiments, the portion of the lower plate 401 between the plurality of optical fiber alignment structures 403-1 to 403-12 and the first guide element alignment structure 405-1 is part of a top surface of the lower plate 401. Similarly, in some embodiments, the portion of the lower plate 401 between the plurality of optical fiber alignment structures 403-1 to 403-12 and the second guide element alignment structure 405-2 is part of the top surface of the lower plate 401. In some embodiments, a first location 401A of the lower plate 401 outside of the first guide element 405-1 has as width, as indicated by arrow 421, within a range extending from about 50 micrometers to about 1000 micrometers. Also, in some embodiments, a second location 401B of the lower plate 401 outside of the second guide element 405-2 has as width, as indicated by arrow 422, within a range extending from about 50 micrometers to about 1000 micrometers.

FIG. 4D shows the front-upper isometric view of the lower plate 401 of FIG. 4A with the plurality of optical fibers 103-1 to 103-12 respectively positioned within the v-grooves of the plurality of optical fiber alignment structures 403-1 to 403-12 within the lower plate 401, in accordance with some embodiments. FIG. 4E shows a front view of the configuration of FIG. 4D, in accordance with some embodiments. Each of the plurality of optical fibers 103-1 to 103-12 has an optical core exposed at the first end 412 of the lower plate 401. Also, each of the plurality of optical fibers 103-1 to 103-12 extends out of the back end of the optical fiber connector 400 opposite from the first end 412 of the lower plate 401. FIG. 4D also shows a first guide element 425-1 disposed within the v-groove that forms the first guide element alignment structure 405-1 within the lower plate 401. The first guide element 425-1 is positioned to extend outside of a periphery of the lower plate 401 at the first end 412 of the lower plate 401. FIG. 4D also shows a second guide element 425-2 disposed within the v-groove that forms the second guide element alignment structure 405-2 within the lower plate 401. The second guide element 425-2 is positioned to extend outside of the periphery of the lower plate 401 at the first end 412 of the lower plate 401.

FIG. 4F shows a top view of the configuration of FIG. 4D, in accordance with some embodiments. Each of the optical fibers 103-1 to 103-12 has a first diameter, as indicated by arrow 430. In some embodiments, the first guide element 425-1 has a first pin section 425-1A and a second pin section 425-1B. In some embodiments, the first pin section 425-1A of the first guide element 425-1 has a second diameter, as indicated by arrow 429, that is substantially equal to the first diameter of the optical fibers 103-1 to 103-12, as indicated by arrow 430. Also, in some embodiments, the second pin section 425-1B of the first guide element 425-1 has a third diameter, as indicated by arrow 427, that is larger than the second diameter, as indicated by arrow 429. The first pin section 425-1A of the first guide element 425-1 is positioned within the first guide element alignment structure 405-1 of the lower plate 401. The second pin section 425-1B of the first guide element 425-1 is positioned outside of the periphery of the lower plate 401 at the first end 412 of the lower plate 401. In some embodiments, the second guide element 425-2 has a first pin section 425-2A and a second pin section 425-2B. In some embodiments, the first pin section 425-2A of the second guide element 425-2 has the second diameter, as indicated by arrow 429, that is substantially equal to the first diameter of the optical fibers 103-1 to 103-12, as indicated by arrow 430. Also, in some embodiments, the second pin section 425-2B of the second guide element 425-2 has the third diameter, as indicated by arrow 427, that is larger than the second diameter, as indicated by arrow 429. The first pin section 425-2A of the second guide element 425-2 is positioned within the second guide element alignment structure 405-2 of the lower plate 401. The second pin section 425-2B of the second guide element 425-2 is positioned outside of the periphery of the lower plate 401 at the first end 412 of the lower plate 401. In some embodiments, each of the first pin section 425-1A of the first guide element 425-1 and first pin section 425-2A of the second guide element 425-2 has a length that extends along a substantial entirety of the length of the corresponding first guide element alignment structure 405-1 and second guide element alignment structure 405-2, respectively. In other embodiments, each of the first pin section 425-1A of the first guide element 425-1 and first pin section 425-2A of the second guide element 425-2 has a length that extends along less than the entire length of the corresponding first guide element alignment structure 405-1 and second guide element alignment structure 405-2, respectively.

In some embodiments, each of the first pin section 425-1A of the first guide element 425-1 and the first pin section 425-2A of the second guide element 425-2 is formed as a cylindrical shaped pin having a circular-shaped vertical cross-section substantially equal to the circular-shaped vertical cross-section of the plurality of optical fibers 103-1 to 103-12. In some embodiments, each of the second pin section 425-1B of the first guide element 425-1 and the second pin section 425-2B of the second guide element 425-2 is formed to have a vertical cross-section shape that is either cylindrical, rectangular, triangular, polygonal, curved, or a combination thereof. It should be understood that the vertical cross-section shape of each of the second pin section 425-1B of the first guide element 425-1 and the second pin section 425-2B of the second guide element 425-2 is formed to match a corresponding receptacle within an optical connector to which the optical fiber connector 400 is to be connected. In this manner, when the second pin section 425-1B of the first guide element 425-1 and the second pin section 425-2B of the second guide element 425-2 are inserted into the corresponding receptacles within the optical connector to which the optical fiber connector 400 is connected, the plurality of optical fibers 103-1 to 103-12 will be appropriately aligned with respective optical devices within the optical connector to which the optical fiber connector 400 is connected. In some embodiments, each of the second pin section 425-1B of the first guide element 425-1 and the second pin section 425-2B of the second guide element 425-2 is formed as a cylindrical shaped pin having a diameter within a range extending from about 500 micrometers to about 1000 micrometers. In some embodiments, each of the second pin section 425-1B of the first guide element 425-1 and the second pin section 425-2B of the second guide element 425-2 is formed as a cylindrical shaped pin having a diameter of about 700 micrometers.

In some embodiments, each of the first guide element 425-1 and the second guide element 425-2 is formed of a material that is mechanically stable at a temperature greater than or equal to about 250° C. In some embodiments, each of the first guide element 425-1 and the second guide element 425-2 is formed of metal. In some embodiments, each of the first guide element 425-1 and the second guide element 425-2 is formed of glass. In some embodiments, each of the first guide element 425-1 and the second guide element 425-2 is formed of ceramic.

FIG. 4G shows a top view of a portion of the first guide element 425-1 and the second guide element 425-2, in accordance with some embodiments. A transition 431 exists between the first pin section 425-1A and the second pin section 425-1B of the first guide element 425-1. Similarly, the transition 431 also exists between the first pin section 425-2A and the second pin section 425-2B of the second guide element 425-2. In some embodiments, the transition 431 between the first pin section 425-1A/425-2A and the second pin section 425-1B/425-2B of each of the first guide element 425-1 and the second guide element 425-2 is a step-shaped transition, such as shown in FIG. 4F. In some embodiments, the transition 431 between the first pin section 425-1A/425-2A and the second pin section 425-1B/425-2B of each of the first guide element 425-1 and the second guide element 425-2 is a taper-shaped transition, such as shown in FIG. 4G. The taper-shaped transition has a tapered surface 433 that extends linearly from the outer surface of the first pin section 425-1A/425-2A to the outer surface of the second pin section 425-1B/425-2B, over a non-zero lengthwise distance along the first guide element 425-1 and the second guide element 425-2, respectively. In some embodiments, the transition 431 between the first pin section 425-1A/425-2A and the second pin section 425-1B/425-2B of each of the first guide element 425-1 and the second guide element 425-2 is a curve-shaped transition.

FIG. 4H shows the front-upper isometric view of the configuration of FIG. 4D with a cover plate 435 disposed over the plurality of optical fibers 103-1 to 103-12 and over the lower plate 401, in accordance with some embodiments. FIG. 4I shows a front view of the configuration of FIG. 4H, in accordance with some embodiments. In some embodiments, the cover plate 435 has a bottom surface that is substantially flat and a top surface that is substantially flat, with the bottom surface of the cover plate 435 oriented to face toward the plurality of optical fibers 103-1 to 103-12. In some embodiments, the cover plate 435 is disposed to have the bottom surface of the cover plate 435 physically contact the plurality of optical fibers 103-1 to 103-12, the first guide element 425-1, and the second guide element 425-2. In some embodiments, the cover plate 435 is formed of a material that is mechanically stable at a temperature greater than or equal to about 250° C. In some embodiments, the cover plate 435 is formed of metal. In some embodiments, the cover plate 435 is formed of glass. In some embodiments, the cover plate 435 is formed of ceramic. In some embodiments, the cover plate 435 has a width, as indicated by arrow 436, that is large enough to cover the plurality of optical fibers 103-1 to 103-12, the first guide element 425-1, and the second guide element 425-2 in the direction of the arrow 436. In some embodiments, the width of the cover plate 435, as indicated by arrow 436, is substantially equal to the width of the lower plate 401, as indicated by arrow 409. In some embodiments, the cover plate 435 has a length, as indicated by arrow 438, that is less than or equal to the length, as indicated by arrow 407, of the lower plate 401. In some embodiments, the length of the cover plate 435, as indicated by arrow 438, is substantially equal to the length of the lower plate 401, as indicated by arrow 407. In some embodiments, the cover plate 435 has a vertical thickness, as indicated by arrow 440, greater than or equal to about 50 micrometers. In some embodiments, the vertical thickness of the cover plate 435, as indicated by arrow 440, is within a range extending from about 150 micrometers to about 1000 micrometers.

In some embodiments, an adhesive 437 is disposed between the cover plate 435 and the lower plate 401, and between the cover plate 435 and the plurality of optical fibers 103-1 to 103-12, and between the cover plate 435 and each of the first guide element 425-1 and the second guide element 425-2. In some embodiments, as the cover plate 435 is pressed to physically contact each of the plurality of optical fibers 103-1 to 103-12, the first guide element 425-1 and the second guide element 425-2. In this manner, the cover plate 435 holds the plurality of optical fibers in place against the lower plate 401, and also holds each of the first guide element 425-1 and the second guide element 425-2 in place against the lower plate 401. The adhesive 437 is pushed into the interstitial spaces between the plurality of optical fibers 103-1 to 103-12 and into the interstitial spaces between the lower plate 401 and the plurality of optical fibers 103-1 to 103-12.

In some embodiments, the cover plate 435 is configured and disposed to physically contact the lower plate 401 at each of the first location 401A of the lower plate 401 outside of the first guide element 405-1 and the second location 401B of the lower plate 401 outside of the second guide element 425-2. However, in some embodiments, a layer of the adhesive 437 is disposed between the cover plate 435 and the lower plate 401 at each of the first location 401A and the second location 401B, such that the cover plate 435 is physically separated from the lower plate 401 by the adhesive 437.

FIG. 4J shows a front-upper isometric view of the configuration of the optical fiber connector 400 with an outer sheath 451 formed around an outside of the cover plate 435 and around an outside of the lower plate 401, in accordance with some embodiments. FIG. 4K shows a front view of the optical fiber connector 400 as shown in FIG. 4J, in accordance with some embodiments. FIG. 4L shows a back-upper perspective view of the configuration of the optical fiber connector 400 as shown in FIG. 4J, in accordance with some embodiments. FIG. 4M shows a transparent view of the optical fiber connector 400 as shown in FIG. 4L, in accordance with some embodiments. The outer sheath 451 is disposed to leave the plurality of optical fibers 103-1 to 103-12 uncovered at an optical connection end 453 of the optical fiber connector 400. In some embodiments, the outer sheath 451 is formed of a material that enhances mechanical and structural strength of the optical fiber connector 400, and that provides for impact resilience of the optical fiber connector 400, such as from external forces. In some embodiments, the outer sheath 451 is formed to have an outer shape and size (form-factor) that is expected of a standard MT ferrule, such that optical fiber connector 400 can be implemented within existing optical fiber systems. In some embodiments, the outer sheath 451 is formed of metal. In some embodiments, the outer sheath 451 is formed of a plastic material that can withstand the high-temperature of the solder reflow process without substantive deformation. FIGS. 4L and 4M show the optical fibers 103-1 to 103-12 extending out of the back end of the optical fiber connector 400.

It should be appreciated that by having the first guide element alignment structure 405-1 and the second guide element alignment structure 405-2 formed in the same manner as each of the plurality of optical fiber alignment structures 403-1 to 403-12 within the lower plate 401 in the optical fiber connector 400, it is possible to improve the position accuracy of the first guide element alignment structure 405-1 and the second guide element alignment structure 405-2 relative to the plurality of optical fiber alignment structures 403-1 to 403-12, because all of the first guide element alignment structure 405-1 and the second guide element alignment structure 405-2 and the plurality of optical fiber alignment structures 403-1 to 403-12 can be formed in the same fabrication process using the same tooling fixture. Also, by having the first guide element alignment structure 405-1 and the second guide element alignment structure 405-2 formed in the same manner as each of the plurality of optical fiber alignment structures 403-1 to 403-12, it is possible to use the one cover plate 435 within the optical fiber connector 400, as compared with use of both the cover plate 107 and the upper plate 109 in the optical fiber connector 100. Also, it should be understood that the materials and configuration of the optical fiber connector 400 is able to withstand solder reflow temperatures in excess of 250° C., without deformation that would lead to increased optical insertion loss through the optical fiber connector 400. Therefore, the optical fiber connector 400 can be attached to an electro-optic chip and/or package before the electro-optic chip and/or package is subjected to a solder reflow process, such as for ball grid array (BGA) reflow in a flip-chip attachment process, among other high-temperature chip fabrication and/or packaging processes.

FIG. 5 shows a flowchart of a method for manufacturing the optical fiber connector 100, 300, in accordance with some embodiments. The method includes an operation 501 for forming the lower plate 101 to include the plurality of optical fiber alignment structures 113 extending from the first end 104 of the lower plate 101 to the second end 106 of the lower plate 101, the first guide element alignment structure 115-1 formed at a first side of the plurality of optical fiber alignment structures 113, and the second guide element alignment structure 115-2 formed at a second side of the plurality of optical fiber alignment structures 113. The method also includes an operation 503 for disposing the plurality of optical fibers 103-1 to 103-12 respectively in the plurality of optical fiber alignment structures 113 of the lower plate 101, such that an end of each of the plurality of optical fibers 103-1 to 103-12 is positioned at the first end 104 of the lower plate 101. The method also includes an operation 505 for disposing the first guide element 105-1 in the first guide element alignment structure 115-1 of the lower plate 101, such that the first guide element 105-1 extends outside of a periphery of the lower plate 101 at the first end 104 of the lower plate 101. The method also includes an operation 507 for disposing the second guide element 105-2 in the second guide element alignment structure 115-2 of the lower plate 101, such that the second guide element 105-2 extends outside of the periphery of the lower plate 101 at the first end 104 of the lower plate 101. The method also includes an operation 509 for disposing the cover plate 107, 301 over the plurality of optical fiber alignment structures 113 and between the first guide element 105-1 and the second guide element 105-2. The method also includes an operation 511 for securing the cover plate 107, 301 to the lower plate 101 so as to hold the plurality of optical fibers 103-1 to 103-12 within the plurality of optical fiber alignment structures 113 of the lower plate 101. The method also includes an operation 513 for disposing the upper plate 109, 313 over each of the cover plate 107, 301, the first guide element 105-1, and the second guide element 105-2. The method also includes an operation 515 for securing the upper plate 109, 313 to the lower plate 101 to hold the first guide element 105-1 within the first guide element alignment structure 115-1 of the lower plate 101 and to hold the second guide element 105-2 within the second guide element alignment structure 115-2 of the lower plate 101. In some embodiments, the method also includes forming the outer sheath 111 around both the upper plate 109 and the lower plate 101.

FIG. 6 shows a flowchart of a method for manufacturing the optical fiber connector 400, in accordance with some embodiments. The method includes an operation 601 for forming the lower plate 401 to include the plurality of optical fiber alignment structures 403-1 to 403-12 extending from the first end of the lower plate 401 to the second end of the lower plate 401, the first guide element alignment structure 405-1 formed at a first side of the plurality of optical fiber alignment structures 403-1 to 403-12, and the second guide element alignment structure 405-2 formed at a second side of the plurality of optical fiber alignment structures 403-1 to 403-12. In some embodiments, each of the plurality of optical fiber alignment structures 403-1 to 403-12 and each of the first guide element alignment structure 405-1 and the second guide element alignment structure 405-2 is formed to have a substantially same shape and size. The method also includes an operation 603 for disposing the plurality of optical fibers 103-1 to 103-12 respectively in the plurality of optical fiber alignment structures 403-1 to 403-12 of the lower plate 401, such that an end of each of the plurality of optical fibers 103-1 to 103-12 is positioned at the first end 412 of the lower plate 401. The method also includes an operation 605 for disposing the first guide element 425-1 in the first guide element alignment structure 405-1 of the lower plate 401, such that the first guide element 425-1 extends outside of a periphery of the lower plate 401 at the first end 412 of the lower plate 401. In some embodiments, a portion of the first guide element 425-1 that extends outside of the periphery of the lower plate 401 has a larger vertical cross-section size than a portion of the first guide element 425-1 that is disposed within the first guide element alignment structure 405-1 of the lower plate 401. The method also includes an operation 607 for disposing the second guide element 425-2 in the second guide element alignment structure 405-2 of the lower plate 401, such that the second guide element 425-2 extends outside of the periphery of the lower plate 401 at the first end 412 of the lower plate 401. In some embodiments, a portion of the second guide element 425-2 that extends outside of the periphery of the lower plate 401 has a larger vertical cross-section size than a portion of the second guide element 425-2 that is disposed within the second guide element alignment structure 405-2 of the lower plate 401. The method also includes an operation 609 for disposing the cover plate 435 over the plurality of optical fiber alignment structures 403-1 to 403-12 and over each of the first guide element 425-1 and the second guide element 425-2. The method also includes an operation 611 for securing the cover plate 435 to the lower plate 401 so as to hold the plurality of optical fibers 103-1 to 103-12 within the plurality of optical fiber alignment structures 403-1 to 403-12 of the lower plate 401, and so as to hold the first guide element 425-1 within the first guide element alignment structure 405-1 of the lower plate 401, and so as to hold the second guide element 425-2 within the second guide element alignment structure 405-2 of the lower plate 401. In some embodiments, the method also includes forming the outer sheath 451 around both the cover plate 435 and the lower plate 401.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An optical fiber connector, comprising:
a lower plate including a plurality of optical fiber alignment structures extending from a first end of the lower plate to a second end of the lower plate, the lower plate including a first guide element alignment structure formed at a first side of the plurality of optical fiber alignment structures, the lower plate including a second guide element alignment structure formed at a second side of the plurality of optical fiber alignment structures;
a plurality of optical fibers respectively disposed in the plurality of optical fiber alignment structures of the lower plate such that an end of each of the plurality of optical fibers is positioned at the first end of the lower plate, wherein each of the plurality of optical fibers has a first diameter;
a first guide element positioned to extend outside of a periphery of the lower plate at the first end of the lower plate, wherein the first guide element includes a first pin section and a second pin section, the first pin section of the first guide element having a second diameter substantially equal to the first diameter, the second pin section of the first guide element having a third diameter larger than the second diameter, the first pin section of the first guide element positioned within the first guide element alignment structure of the lower plate, the second pin section of the first guide element positioned outside of the periphery of the lower plate at the first end of the lower plate;
a second guide element positioned to extend outside of the periphery of the lower plate at the first end of the lower plate, wherein the second guide element includes a first pin section and a second pin section, the first pin section of the second guide element having the second diameter, the second pin section of the second guide element having the third diameter, the first pin section of the second guide element positioned within the second guide element alignment structure of the lower plate, the second pin section of the second guide element positioned outside of the periphery of the lower plate at the first end of the lower plate;
a cover plate disposed over the plurality of optical fiber alignment structures, the cover plate positioned between the first guide element and the second guide element, the cover plate secured to the lower plate to hold the plurality of optical fibers within the plurality of optical fiber alignment structures of the lower plate; and
an upper plate disposed over each of the cover plate, the first guide element, and the second guide element, the upper plate secured to the lower plate to hold the first guide element within the first guide element alignment structure of the lower plate and the second guide element within the second guide element alignment structure of the lower plate.

2. The optical fiber connector as recited in claim 1, further comprising:
a first adhesive disposed between the cover plate and the lower plate.

3. The optical fiber connector as recited in claim 2, further comprising:

a second adhesive disposed between the upper plate and each of the cover plate and the lower plate.

4. The optical fiber connector as recited in claim 1, wherein a substantially planar portion of the upper plate extends over each of the cover plate, the first guide element, and the second guide element.

5. The optical fiber connector as recited in claim 1, wherein the upper plate extends over the lower plate at a first location outside of the first guide element relative to the cover plate, and wherein the upper plate extends over the lower plate at a second location outside of the second guide element relative to the cover plate.

6. The optical fiber connector as recited in claim 5, further comprising:

an adhesive disposed between the upper plate and the lower plate at each of the first location outside of the first guide element relative to the cover plate and the second location outside of the second guide element relative to the cover plate.

7. The optical fiber connector as recited in claim 1, wherein each of the first and second guide element alignment structures of the lower plate is sized to provide a substantially coplanar alignment of centerlines of the plurality of optical fibers with centerlines of the first and second guide elements.

8. The optical fiber connector as recited in claim 1, wherein the lower plate, the cover plate, and the upper plate are formed of a material that is mechanically stable at a temperature greater than or equal to about 250° Celsius.

9. The optical fiber connector as recited in claim 1, wherein the lower plate, the cover plate, and the upper plate are formed of one or more of a glass material, a metal material, and a ceramic material.

10. The optical fiber connector as recited in claim 9, further comprising:

an outer sheath formed around an outside of the lower plate and around an outside of the upper plate.

11. The optical fiber connector as recited in claim 10, wherein the outer sheath is formed of a plastic material.

12. The optical fiber connector as recited in claim 1, wherein the cover plate is disposed to physically contact the plurality of optical fibers, wherein the upper plate is disposed to physically contact the cover plate, and wherein the upper plate is disposed to physically contact each of the first guide element and the second guide element.

13. The optical fiber connector as recited in claim 1, wherein each of the plurality of optical fibers has an optical core exposed at a first end of the optical fiber connector corresponding to the first end of the lower plate, and wherein each of the plurality of optical fibers extends out of a second end of the optical fiber connector opposite from the first end of the optical fiber connector.

14. The optical fiber connector as recited in claim 13, wherein each of the plurality of optical fiber alignment structures and each of the first and second guide element alignment structures extends in a linear direction from the first end of the optical fiber connector toward the second end of the optical fiber connector.

15. The optical fiber connector as recited in claim 1, wherein the cover plate has a bottom surface that is substantially flat and a top surface that is substantially flat, the bottom surface of the cover plate oriented to face toward the plurality of optical fibers.

16. The optical fiber connector as recited in claim 15, wherein the upper plate has a bottom surface that is substantially flat and a top surface that is substantially flat, the bottom surface of the upper plate oriented to face toward the top surface of the cover plate.

17. The optical fiber connector as recited in claim 1, wherein said plurality of optical fiber alignment structures of the lower plate is a first plurality of optical fiber alignment structures, wherein said plurality of optical fibers is a first plurality of optical fibers, wherein the cover plate has a bottom surface that is substantially flat and oriented to face toward the first plurality of optical fibers, wherein the cover plate has a top surface that includes a second plurality of optical fiber alignment structures, wherein the optical fiber connector further includes a second plurality of optical fibers respectively disposed in the second plurality of optical fiber alignment structures, and wherein the upper plate is disposed over the cover plate and over the second plurality of optical fibers so as to hold the second plurality of optical fibers within the second plurality of optical fiber alignment structures.

18. The optical fiber connector as recited in claim 17, wherein the second plurality of optical fiber alignment structures is oriented to extend in a same direction as the first plurality of optical fiber alignment structures, such that the second plurality of optical fibers is oriented parallel to the first plurality of optical fibers within the optical fiber connector.

19. The optical fiber connector as recited in claim 18, wherein the second plurality of optical fiber alignment structures is substantially vertically aligned with the first plurality of optical fiber alignment structures, such that each of the second plurality of optical fibers is positioned substantially vertically above a corresponding one of the first plurality of optical fibers within the optical fiber connector.

20. The optical fiber connector as recited in claim 19, wherein the upper plate has a bottom surface that includes a recessed region configured to receive at least a vertical cross-sectional portion of the second plurality of optical fibers.

21. The optical fiber connector as recited in claim 20, wherein the recessed region of the bottom surface of the upper plate is configured to receive at least a vertical cross-sectional portion of the cover plate.

22. The optical fiber connector as recited in claim 1, wherein each of the plurality of optical fiber alignment structures is a respective v-groove structure, and wherein each of the first and second guide element alignment structures is a respective v-groove structure.

23. The optical fiber connector as recited in claim 22, wherein each of the v-groove structures of the plurality of optical fiber alignment structures and each of the v-groove structures of the first and second guide element alignment structures has a substantially same configuration.

24. The optical fiber connector as recited in claim 1, wherein a transition between the first pin section and the second pin section of each of the first guide element and the second guide element is a step-shaped transition.

25. The optical fiber connector as recited in claim 1, wherein a transition between the first pin section and the second pin section of each of the first guide element and the second guide element is a taper-shaped transition.

26. The optical fiber connector as recited in claim 1, wherein a transition between the first pin section and the second pin section of each of the first guide element and the second guide element is a curve-shaped transition.

* * * * *